US010553894B2

(12) United States Patent
Sugizaki et al.

(10) Patent No.: US 10,553,894 B2
(45) Date of Patent: Feb. 4, 2020

(54) ELECTRODE STRUCTURE, SECONDARY BATTERY, BATTERY PACK, AND VEHICLE

(71) Applicant: KABUSHIKI KAISHA TOSHIBA, Minato-ku (JP)

(72) Inventors: Tomoko Sugizaki, Kawasaki (JP); Takuya Iwasaki, Uenohara (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/692,200

(22) Filed: Aug. 31, 2017

(65) Prior Publication Data
US 2018/0277882 A1 Sep. 27, 2018

(30) Foreign Application Priority Data

Mar. 21, 2017 (JP) .................................. 2017-054629

(51) Int. Cl.
*H01M 10/052* (2010.01)
*H01M 10/625* (2014.01)
*H01M 2/16* (2006.01)
*H01M 4/139* (2010.01)
*H01M 4/36* (2006.01)
*H01M 10/04* (2006.01)
*H01M 2/18* (2006.01)

(52) U.S. Cl.
CPC ....... *H01M 10/052* (2013.01); *H01M 2/1686* (2013.01); *H01M 2/18* (2013.01); *H01M 4/139* (2013.01); *H01M 4/366* (2013.01); *H01M 10/0431* (2013.01); *H01M 10/625* (2015.04)

(58) Field of Classification Search
None
See application file for complete search history.

(56) References Cited

U.S. PATENT DOCUMENTS

| 5,478,362 A * | 12/1995 | Oota ........................ H01M 6/10 29/623.1 |
| 2011/0217590 A1 | 9/2011 | Nakano et al. |
| 2012/0156568 A1* | 6/2012 | Kia ........................ H01M 2/145 429/246 |
| 2013/0017425 A1 | 1/2013 | Watanabe et al. |
| 2013/0101876 A1 | 4/2013 | Ueki et al. |
| 2015/0140200 A1 | 5/2015 | Rouault et al. |
| 2018/0034098 A1* | 2/2018 | Hasegawa .............. H01G 11/52 |

FOREIGN PATENT DOCUMENTS

| JP | 5218873 B2 | 3/2013 |
| JP | 2013-127857 A | 6/2013 |
| JP | 5616296 B2 | 9/2014 |
| JP | 5737022 B2 | 5/2015 |
| JP | 2015-522928 A | 8/2015 |
| WO | WO 2010-064288 | 6/2010 |
| WO | WO 2016133095 * | 8/2016 |
| WO | WO 2017-007015 | 1/2017 |

* cited by examiner

*Primary Examiner* — Ladan Mohaddes
(74) *Attorney, Agent, or Firm* — Oblon, McClelland, Maier & Neustadt, L.L.P.

(57) ABSTRACT

According to one embodiment, an electrode structure is provided. The electrode structure includes a current collector, an active material layer provided on at least one surface of the current collector, and a separator layer provided on the active material layer. The separator layer includes a first region, and a second region which is adjacent to the first region and exists in the inside of the first region. An outline of a principal surface of the active material layer overlaps the first region of the separator layer, and a thickness of at least a part of the first region is thicker than a thickness of the second region.

15 Claims, 12 Drawing Sheets

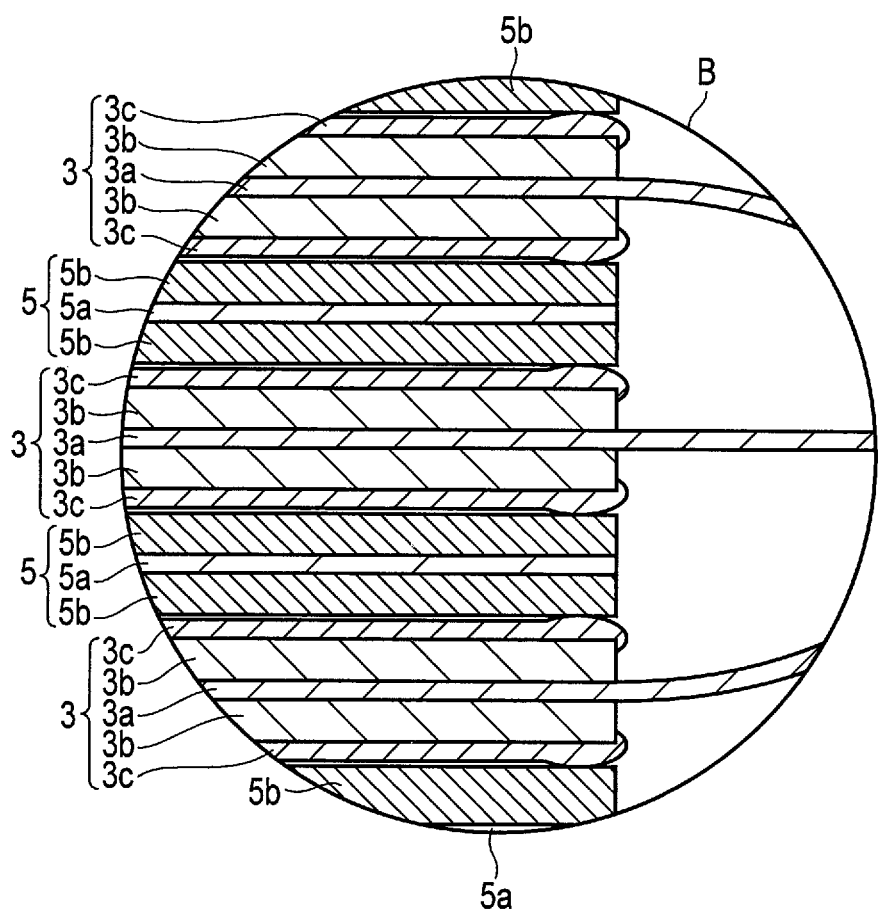
F I G. 6

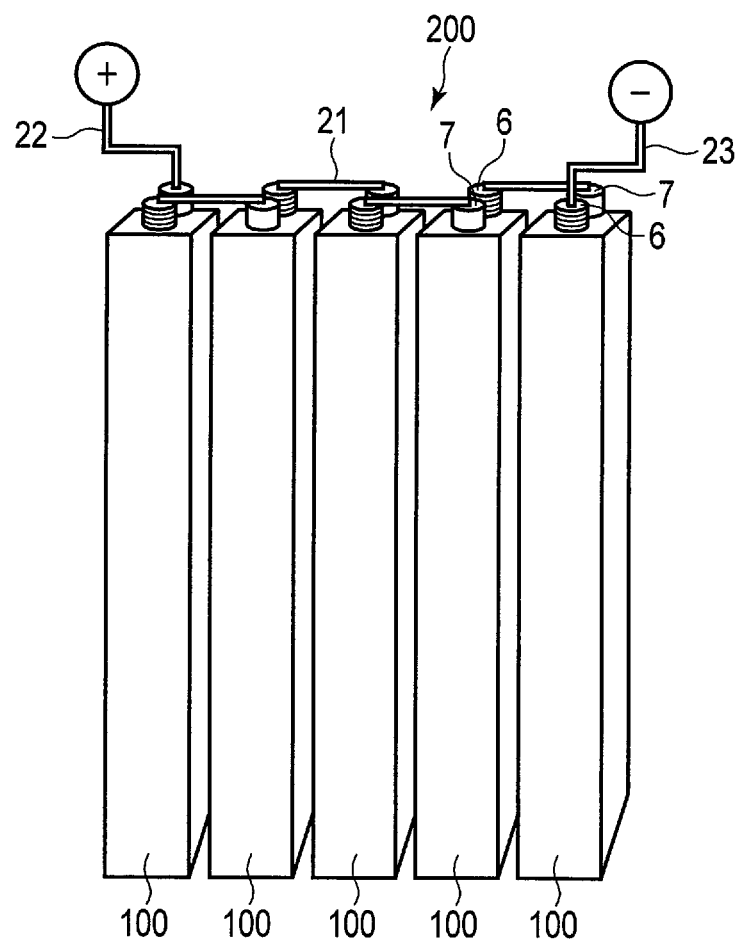
F I G. 10

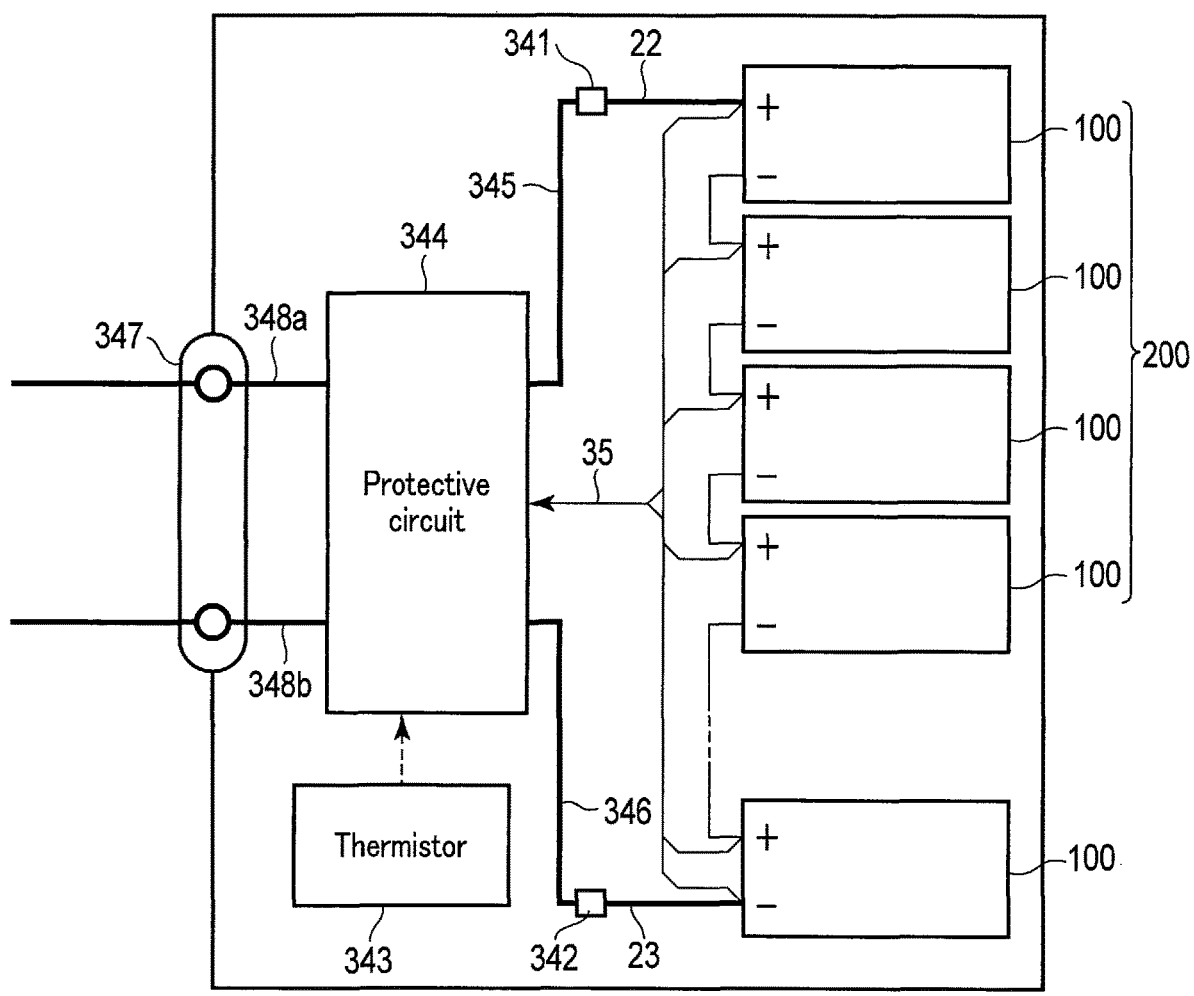
F I G. 12
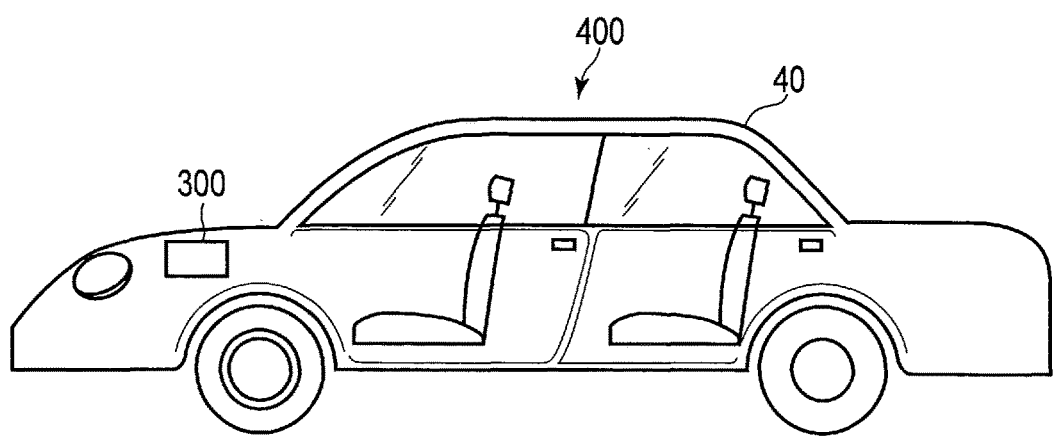
F I G. 13

ELECTRODE STRUCTURE, SECONDARY BATTERY, BATTERY PACK, AND VEHICLE

CROSS-REFERENCE TO RELATED APPLICATION

This application is based upon and claims the benefit of priority from prior Japanese Patent Application No. 2017-054629, filed Mar. 21, 2017, the entire contents of which are incorporated herein by reference.

FIELD

Embodiments described herein relate generally to an electrode structure, a secondary battery, a battery pack, and a vehicle.

BACKGROUND

Nonaqueous electrolyte secondary batteries containing a positive electrode and a negative electrode, which allows lithium ions to be inserted and extracted, have been widely spread in various fields including electric automobiles, power storage systems and information devices as a battery having a high energy density. Accordingly, demands on such batteries have increased, and studies thereof have gathered pace.

In order to use the nonaqueous electrolyte secondary battery for a power source for an electric automobile, it is required that an energy density is high, i.e., a discharge capacity per unit weight or unit volume is large.

On the other hand, the safety becomes an issue as the discharge capacity per unit weight or unit volume becomes larger, and a secondary battery having a more excellent safety is required. One answer to solve the problem described above is an all solid secondary battery. The all solid secondary battery is a secondary battery using a solid electrolyte, literally, instead of a nonaqueous electrolyte, i.e., an organic electrolytic solution, which has been used up till now. The organic electrolytic solution is flammable, and thus technological developments to improve the safety when the organic electrolytic solution is used are energetically performed. Nevertheless, it is difficult to secure the sufficient safety. The all solid secondary battery needs not to use the organic electrolytic solution, and thus cannot be ignited in this case. Thus, the all solid secondary battery is a secondary battery having the very high safety.

However, since lithium ion conductivity of the all solid secondary battery tends to be lowered between a positive electrode and a negative electrode, an electrolytic solution may be used according to a configuration of a battery.

BRIEF DESCRIPTION OF THE DRAWINGS

FIG. 6 is an enlarged cross-sectional view showing a part B in FIG. 5;

FIG. 10 is a perspective view schematically showing one example of battery modules according to the second embodiment;

FIG. 12 is a block diagram showing one example of electric circuits of the battery pack shown in FIG. 11;

FIG. 13 is a cross-sectional view schematically showing one example of a vehicle according to a fourth embodiment;

DETAILED DESCRIPTION

Figure 1:
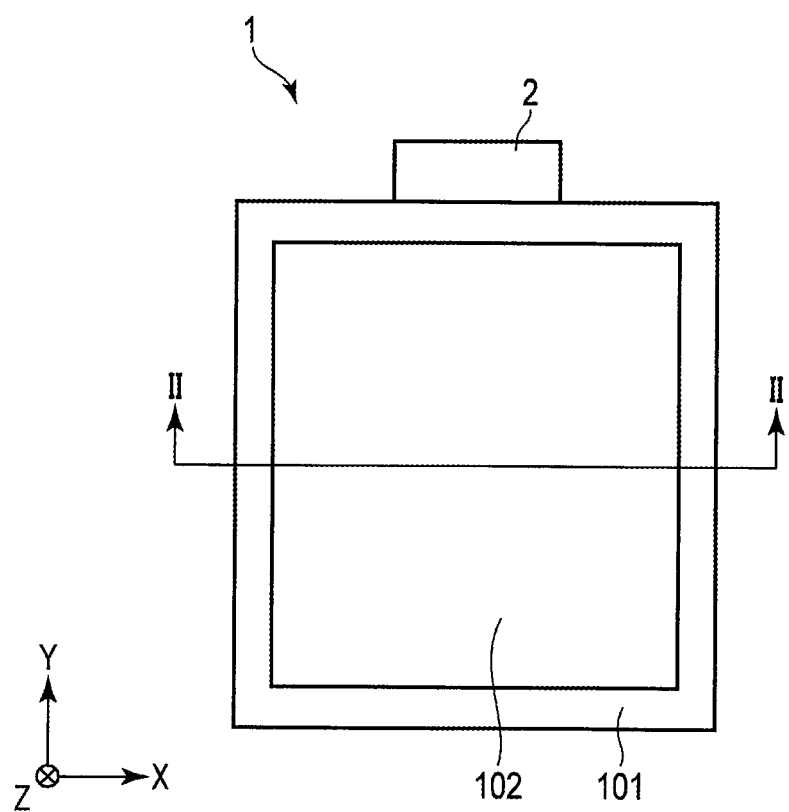
FIG. 1 is a plan view schematically showing one example of electrode structures according to a first embodiment.

According to a first embodiment, an electrode structure is provided. The electrode structure includes a current collector, an active material layer provided on at least one surface of the current collector, and a separator layer provided on the active material layer. The separator layer includes a first region, and a second region which is adjacent to the first region and exists in the inside of the first region. An outline of a principal surface of the active material layer overlaps the first region of the separator layer, and a thickness of at least a part of the first region of the separator layer is thicker than a thickness of the second region of the separator layer.

According to a second embodiment, a secondary battery is provided. The secondary battery includes the electrode structure according to the first embodiment.

According to a third embodiment, a battery pack is provided. The battery pack includes a secondary battery according to the second embodiment.

According to a fourth embodiment, a vehicle is provided. The vehicle includes a battery pack according to the third embodiment.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an electrode structure is provided. The electrode structure includes a current collector, an active material layer provided on at least one surface of the current collector, and a separator layer provided on the active material layer. The separator layer includes a first region, and a second region which is adjacent to the first region and exists in the inside of the first region. An outline of a principal surface of the active material layer overlaps the first region of the separator layer, and a thickness of at least a part of the first region of the separator layer is thicker than a thickness of the second region of the separator layer.

As an example of a technique related to the production of the electrode structure used for the secondary battery, there is a technique of providing a solid electrolyte layer including inorganic particles or the like on an active material layer. The electrode structure including the solid electrolyte layer, which also functions as the separator, for example, can be produced by laminating the active material layer and the solid electrolyte layer in this order on at least one surface of the current collector.

The active material layer included in the electrode structure repeats expansion and contraction by charge and discharge. Therefore, the active material layer gradually peels off from the current collector and breaks along a thickness direction of the active material layer. This phenomenon is also called electrode breakage. When the electrode breakage occurs, it is highly likely that undesirable side reaction will occur. In addition, there is also a possibility that resistance will increase.

The inventors of the present application have focused on the fact that electrode breakage occurred remarkably in an outer edge portion of an active material layer, and could inhibit the electrode breakage by devising a structure of a solid electrolyte layer (separator layer) laminated on the active material layer. When the electrode breakage can be inhibited, cycle life time property can be improved.

Hereinafter, an electrode structure according to an embodiment will be described with reference to the drawings.

Figure 2:
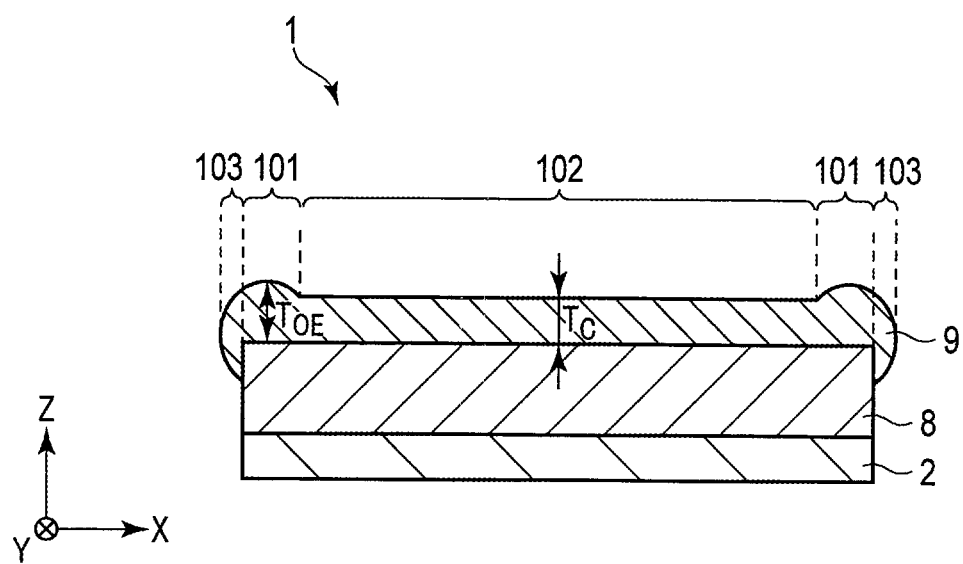
FIG. 2 is a cross-sectional view along a line II-II showing the electrode structure shown in FIG. 1.

FIG. 1 is a plan view schematically showing one example of electrode structures according to an embodiment. FIG. 2 is a cross-sectional view along a line II-II showing the electrode structure shown in FIG. 1.

In the following descriptions, X-direction and Y-direction are directions parallel to a principal surface of a current collector and orthogonal to each other. In addition, Z-direction is a direction vertical to the X-direction and the Y-direction. That is, the Z-direction is a thickness direction.

An electrode structure 1 includes a current collector 2, an active material layer 8, and a separator layer 9.

FIG. 1 and FIG. 2 show a state in which the current collector 2 is a foil extending in the X-direction and the Y-direction. The current collector 2 may be a porous body or a mesh. As shown in FIG. 1, the current collector 2 has, for example, a shape in which a part of one side of four sides of the rectangular foil protrudes in the Y-direction. The protruding part can function as an electrode tab. The shape of the current collector 2 is not limited thereto.

The active material layer 8 and the separator layer 9 are laminated in this order on at least one surface of the current collector 2. FIG. 1 and FIG. 2 show a case in which the active material layer 8 and the separator layer 9 are laminated on one surface of the current collector 2, as one example. The active material layer 8 and the separator layer 9 may be provided on both sides of the current collector 2. The active material layer 8 and the separator layer 9 are not provided in the protruding part (tab part) included in the current collector 2, and the principal surface of the current collector 2 is exposed in the tab part.

The separator layer 9 includes a first region 101, and a second region 102 which is adjacent to the first region 101 and exists in the inside of the first region. At least a part of the first region 101 included in the separator layer 9 faces the active material layer 8. A whole surface of the second region 102 included in the separator layer 9 faces the active material layer 8. The first region 101 is also referred to as an outer edge region of the separator layer 9. The second region 102 is also referred to as a central region of the separator layer 9.

The active material layer 8 partially covers the principal surface of the current collector 2. The active material layer 8 is, for example, a layer in the form of a sheet. FIG. 1 and FIG. 2 show a case in which the active material layer 8 covers the whole principal surface of the current collector 2 excluding the tab part, as one example. The outline of the principal surface of the active material layer 8 overlaps the first region 101 of the separator layer 9 along the Z-direction of the electrode structure 1.

The separator layer 9 is provided on the active material layer 8. The separator layer 9 may have a third region which is not included in the first region and the second region. The third region included in the separator layer 9, for example, covers at least a part of a side surface of the active material layer 8 as shown in FIG. 2. It is preferable that the separator layer 9 covers at least a part of the side surface of the active material layer 8, because when multiple electrode structures are laminated, an active material layer included in a certain electrode structure and an active material layer included in another electrode structure are less likely to come into contact with each other, and as a result, the possibility of occurrence of short circuit can be reduced. Note that the third region 103 is not shown in FIG. 1.

An thickness of at least a part of the first region 101 of the separator layer 9 is thicker than that of the second region 102 of the separator layer 9. A ratio of an area of the first region 101, a layer thickness of which is thicker than that of the second region 102, to a total area of the principal surface of the first region is in a range of, for example, 5% to 100%.

When at least a part of the first region 101 of the separator layer 9 is thicker than the second region 102 of the separator layer 9, the electrode breakage in the outer edge region of the active material layer can be inhibited, and thus the occurrence of undesirable side reaction can be suppressed. Therefore, the electrode structure according to the embodiment can achieve the excellent cycle life time property.

The electrode structure 1 shown in FIG. 1 and FIG. 2 will be described in more detail.

The outline of the principal surface of the active material layer 8 laminated on the current collector 2 is rectangular. A whole surface of the first region 101 of the separator layer 9 and a whole surface of the second region 102 of the separator layer 9 face the active material layer 8. The active material layer 8 does not include a portion facing the third region 103 of the separator layer 9. That is, the outer peripheral shape of the first region 101 of the separator layer 9 corresponds to the outer peripheral shape of the active material layer 8, and for example, substantially matches the outer peripheral shape of the active material layer 8. Therefore, the outer peripheral shape of the first region 101 of the separator layer 9 corresponds to the outline of the principal surface of the active material layer 8, and for example, is substantially the same rectangle or the same square.

On the other hand, the inner peripheral shape of the first region 101 or the outer peripheral shape of the second region 102 is a rectangle similar to the above-described rectangle and is a rectangle smaller in area than the above-described rectangle. That is, the outer peripheral shape and the inner peripheral shape of the first region 101 are rectangles similar to each other. Alternatively, the outer peripheral shape and the inner peripheral shape of the first region 101 are squares similar to each other. For example, the separator layer 9 includes a side portion surrounded by the outer periphery of the first region 101 and the inner periphery of the first region 101, and the side portion is composed of four sides. The inner peripheral shape of the first region 101 need not be an exact rectangle.

The first region 101 of the separator layer 9 has four edges corresponding to the outer peripheral shape of the first region 101. Among the four sides constituting the first region 101 of the separator layer 9, at least one of an average thickness of a first pair of two sides facing each other and an average thickness of a second pair of the other two sides facing each other is larger than a thickness of the second region 102 of the separator layer 9.

The electrode structure 1 shown in FIG. 1 and FIG. 2 shows a case in which both the average thickness of the first pair and the average thickness of the second pair are larger than the thickness of the second region 102 of the separator layer 9, as one example. That is, in the electrode structure 1, the average thickness of the four sides constituting the first region 101 of the separator layer 9 is thicker than the thickness of the second region 102 of the separator layer 9. In this case, the electrode breakage is inhibited over the whole outer edge region of the active material layer 8, thereby achieving the excellent cycle life time property.

Figure 3:
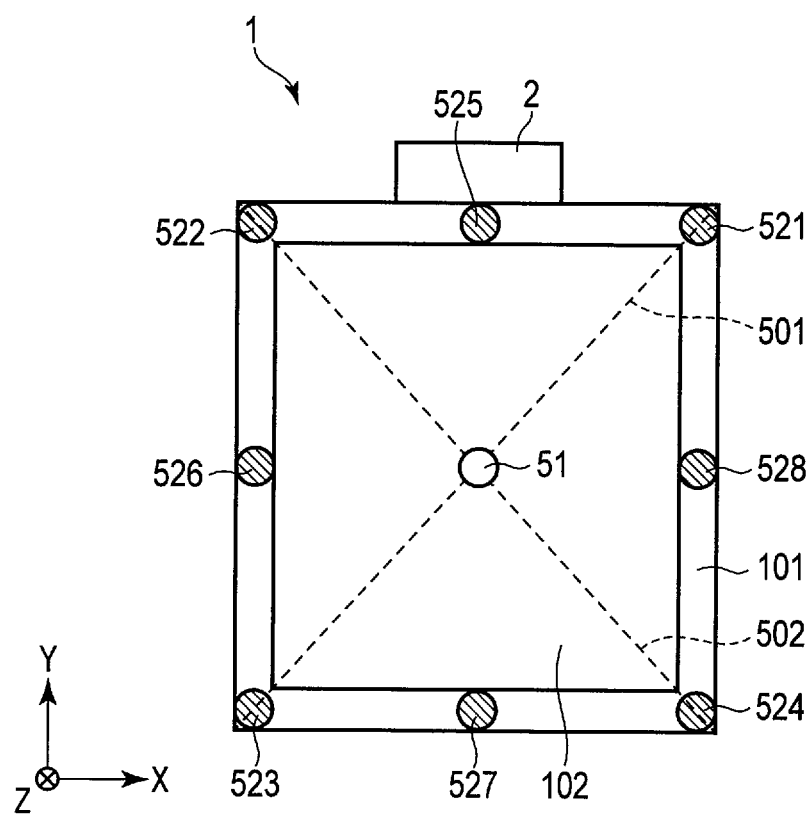
FIG. 3 is a plan view virtually showing a measurement point of a layer thickness of a separator layer.

A method of measuring an average thickness $T_{OE}$ of the first region 101 of the separator layer 9 and a method of measuring a thickness $T_C$ of the second region 102 of the separator layer 9 will be described with reference to FIG. 3. FIG. 3 is a plan view virtually showing a measurement point of a layer thickness of a separator layer.

First, an outer container of a battery is cut and an electrode structure is taken out. In a case in which the electrode structure is a single body of a positive electrode or a negative electrode, the electrode structure is dried to volatilize an electrolyte. In a case in which the electrode structure includes multiple positive electrodes and multiple negative electrodes, laminated electrodes are peeled off one by one, and an electrode where a separator layer is provided is dried to volatilize an electrolyte. In this way, the electrode to be measured is prepared.

Here, as one example, a case in which the electrode to be measured is the electrode structure 1 shown in FIG. 3 will be described. The electrode structure 1 shown in FIG. 3 has the same configuration as the electrode structure 1 shown in FIG. 1 and FIG. 2. For the measurement of the thickness of the separator layer which will be described below, for example, a digital indicator manufactured by Mitutoyo Corporation can be used. A probe diameter is, for example, 5 mm.

First, as described below, the thickness $T_C$ of the second region 102 of the separator layer 9 is measured. The thickness of the second region 102 of the separator layer 9 is the thickness of the separator layer 9 in the central part of the electrode structure 1. The thickness of the separator layer 9 in the central part of the electrode structure 1 is the thickness of the separator layer 9 at a measurement point 51 shown in FIG. 3. The position of the measurement point 51 is a position of an intersection point of two diagonal lines 501 and 502 of the rectangle corresponding to the outline of the principal surface of the separator layer 9.

Subsequently, as described below, the average thickness $T_{OE}$ of the first region 101 of the separator layer 9 is measured. First, on one diagonal line 501 of the rectangle corresponding to the outline of the principal surface of the separator layer 9, the thicknesses of the separator layer 9 are respectively measured at positions spaced 2.5 mm apart from both ends of the diagonal line 501. In addition, on the other diagonal line 502 of the rectangle corresponding to the outline of the principal surface of the separator layer 9, the thicknesses of the separator layer 9 are respectively measured at positions spaced 2.5 mm apart from both ends of the diagonal line 502. In this way, as shown on the diagonal lines 501 and 502 shown in FIG. 3, the thicknesses of the separator layer 9 are measured at four measurement points 521 to 524.

Furthermore, the thicknesses of the separator layer 9 are measured at midpoints 525 to 528 between the four measurement points 521 to 524 measured as described above. That is, the thicknesses of the separator layer 9 are measured at the midpoint 525 between the measurement points 521 and 522, the midpoint 526 between the measurement points 522 and 523, the midpoint 527 between the measurement points 523 and 524, and the midpoint 528 between the measurement points 524 and 521. In this way, it is possible to measure the thicknesses of the separator layer 9 at the eight measurement points 521 to 528.

Subsequently, for each of the four sides constituting the rectangle corresponding to the outer peripheral shape of the first region 101 of the separator layer 9, the average thickness is calculated by using the eight measurement values previously measured. That is, the average thickness of the measurement points 521, 525, and 522, the average thickness of the measurement points 522, 526, and 523, the average thickness of the measurement points 523, 527, and 524, and the average thickness of the measurement points 524, 528, and 521 are calculated.

Each of the average thicknesses of the four sides calculated in this way is compared with the previously measured thickness $T_C$ of the second region 102 of the separator layer 9. As a result of the comparison, the side having an average thickness larger than the thickness $T_C$ of the second region 102 of the separator layer 9 among the average thicknesses of the four sides is determined.

For multiple sides having an average thickness larger than the thickness $T_C$ of the second region 102 of the separator layer 9, an average value of the average thicknesses is additionally calculated. The average value calculated in this way is the average thickness $T_{OE}$ of the first region 101 of the separator layer 9. For example, the average thickness $T_{OE}$ of the first region 101 is the average thickness of the side portion of the separator layer 9. As stated above, the side portion is typically composed of the four sides.

When only the average thickness of one side among the average thicknesses of the four sides constituting the first region 101 of the separator layer 9 is larger than the thickness $T_C$, the average thickness of one side is regarded as the average thickness $T_{OE}$ of the first region 101 of the separator layer 9.

A ratio $T_{OE}/T_C$ of the average thickness $T_{OE}$ of the first region 101 of the separator layer 9 to the thickness $T_C$ of the second region 102 of the separator layer 9 is within a range of, for example, 1.05 to 2.30, preferably 1.2 to 1.8. The ratio $T_{OE}/T_C$ is more preferably within a range of 1.2 to 1.4. When the ratio $T_{OE}/T_C$ is within a range of 1.05 to 2.30, the electrode breakage in the outer edge region of the active material layer 8 can be inhibited, thereby achieving the excellent cycle life time property. When the ratio $T_{OE}/T_C$ is less than 1.05, there is a possibility that the effect of inhibiting the electrode breakage will not be sufficiently exhibited. When the ratio $T_{OE}/T_C$ is excessively large, there is a possibility that the separator layer 9 will easily break and peel off from the active material layer 8.

When the rectangle corresponding to the outer peripheral shape of the first region 101 is defined as a first rectangle and the rectangle corresponding to the inner peripheral shape of the first region 101 is defined as a second rectangle, a ratio S2/S1 of an area S2 of the second rectangle to an area S1 surrounded by the first rectangle and the second rectangle is within a range of, for example, 1 to 10, preferably 2.5 to 10. When the ratio is excessively small, a volume of the separator layer 9 becomes too large and thus there is a possibility that a volume energy density of a secondary battery to be produced will be reduced. When the ratio is excessively large, a width of the first region 101 becomes too small and thus there is a possibility that the effect of inhibiting the electrode breakage will not be sufficiently exhibited.

In addition, a ratio of a width of the first region 101 to a width of the electrode structure 1 is within a range of, for example, 5% to 20%, preferably 5% to 15%. When the ratio is within a range of 5% to 15%, the electrode breakage can be inhibited while suppressing a reduction in a volume energy density of a secondary battery to be produced.

The measurement of the ratio of the width of the first region 101 to the width of the electrode structure 1 is performed as follows.

First, the electrode structure 1 is cut along any one of the arbitrary surfaces perpendicular to the principal surface of the separator layer 9 and passing through the central part of the electrode structure 1. At this time, the cut surface is cut so as to pass through an side having an average thickness larger than the thickness $T_C$ of the second region 102 of the separator layer 9 among the four sides constituting the first region 101 of the separator layer 9. A width of the cut surface in a direction parallel to the principal surface of the separator layer 9 is defined as a width of the electrode structure 1. The determination of the position of the central part of the electrode structure 1 is performed in the same manner as described above in the determination of the position of the measurement point 51.

The width of the first region 101 can be determined by observing the cut surface thereof with a scanning electron microscope (SEM).

Alternatively, the width of the electrode structure 1 and the width of the first region 101 can be determined by measuring the surface shape of the separator layer 9 by using a stylus type profiler, without cutting the electrode structure 1. In this case, the width of the electrode structure 1 is a line segment parallel to the principal surface of the separator layer 9 and is the width of the separator layer 9 along an arbitrary line segment passing through the central part of the electrode structure 1. As the stylus type profiler, for example, P-7 or P-17 manufactured by ULVAC, Inc. may be used.

In addition, the width of the second region 102 can also be observed on the cut surface. A ratio of the width of the second region 102 to the width of the electrode structure 1 is within a range of, for example, 70% to 95%, preferably 85% to 95%. When the ratio is within a range of 70% to 95%, the electrode breakage can be inhibited while suppressing a reduction in a volume energy density of a secondary battery to be produced.

In the electrode structure 1, when the outline of the principal surface of the active material layer 8 is a rectangle, for example, the average thickness of two sides existing on the long sides of the rectangle among four sides constituting the first region 101 of the separator layer 9 is thicker than the thickness of the second region 102 of the separator layer 9. In this case, as compared with a case where the average thickness of two sides existing on the short sides is thicker than the thickness of the second region 102 of the separator layer 9, a thick region of the separator layer 9 extends over a long distance and the effect of inhibiting the electrode breakage is great, thereby achieving the excellent cycle life time property.

When the outline of the principal surface of the active material layer 8 is a rectangle, only the average thickness of two sides existing on the long sides among four sides constituting the first region 101 of the separator layer 9 may be thicker than the thickness $T_C$ of the second region 102 of the separator layer 9, only the average thickness of two sides existing on the short sides may be thicker than the thickness $T_C$, and both the average thickness of the two sides existing on the long sides and the average thickness of the two sides existing on the short sides may be thicker than the thickness $T_C$.

Next, materials, dimensions, and the like of the current collector, the active material layer, and the separator layer included in the electrode structure according to the embodiment will be described.

The active material layer has, for example, a thickness of 5 μm to 100 μm.

When the electrode structure is uses as the negative electrode, the current collector and the active material layer may have, for example, the following structure.

As the negative electrode current collector, a material that is electrochemically stable at insertion and extraction potentials of lithium ions of a negative electrode active material can be used. The negative electrode current collector is preferably formed from copper, nickel, stainless steel or aluminum, or aluminum alloy containing at least one element selected from Mg, Ti, Zn, Mn, Fe, Cu, and Si. The negative electrode current collector has preferably a thickness of 5 μm to 20 μm. The negative electrode current collector having such a thickness can balance the strength and the weight reduction of the electrode structure.

As the negative electrode active material, for example, a compound allowing lithium ions to be inserted therein at a voltage of 0.4 V or more to lithium metal can be used. When such a compound is used, it is possible to inhibit the deposition of the metal lithium on the surface of the electrode. When the discharge is performed at a large current, therefore, it is possible to prevent the occurrence of the internal short circuit. Examples of such a compound may include metal oxides, metal sulfides, metal nitrides, and alloys. As the negative electrode active material, it is possible to use, for example, compounds allowing lithium ions to be inserted therein at a voltage of 3 V (vs. Li/Li$^+$) or less, and it is preferable to use compounds allowing lithium ions to be inserted therein at a voltage of 2 V (vs. Li/Li$^+$) or less.

Examples of the metal oxide may include lithium-titanium oxide, titanium oxide, niobium oxide, niobium-titanium oxide, sodium-niobium-titanium oxide, silicon oxide, and the like.

As the lithium-titanium oxide, it is possible to use, for example, $Li_{4+x}Ti_5O_{12}$ where $-1 \leq x \leq 3$ having a spinel structure; $Li_{2+x}Ti_3O_7$ where $0 \leq x \leq 1$ having a ramsdellite structure; $Li_{1+x}Ti_2O_4$ where $0 \leq x \leq 1$, $Li_{1.1+x}Ti_{1.8}O_4$ where $0 \leq x \leq 1$ $Li_{1.07+x}Ti_{1.86}O_4$ where $0 \leq x \leq 1$, $Li_xTiO_2$ where $0 \leq x \leq 1$, $Li_xM1_{1-y}M2_yTi_{6-z}M3_zO_{14+\delta}$ where M1 is at least one element selected from Sr, Ba, Ca, and Mg, M2 is at least one element selected from Cs, K, and Na, and M3 is at least one element selected from Al, Fe, Zr, Sn, V, Nb, Ta, and Mo, $2 \leq x \leq 6$, $0 \leq y \leq 1$, $0 \leq z < 6$, and $-0.5 \leq \delta \leq 0.5$; $Li_{2+w}Na_{2-x}M1_yTi_{6-z}M2_zO_{14+\delta}$ where M1 is at least one element selected from Cs and K, M2 is at least one element selected from Zr, Sn, V, Nb, Ta, Mo, W, Fe, Co, Mn and Al, $0 \leq w \leq 4$, $0 \leq x<2$, $0 \leq y \leq 2$, $0 \leq z<6$, and $-0.5 \leq \delta \leq 0.5$, or the like. The lithium titanium oxides described above are preferable because their volume change is small upon the insertion and extraction of lithium.

The titanium oxide may include, for example, anatase structure $TiO_2$, monoclinic $TiO_2$ (B), and the like.

The niobium oxide may include, for example, $Nb_2O_5$.

The niobium-titanium oxide may include, for example, $Li_aTiM_bNb_{2\pm\beta}O_{7\pm\sigma}$ where $0 \leq z \leq 5$, $0 \leq b \leq 0.3$, $0 \leq \beta \leq 0.3$, $0 \leq \sigma \leq 0.3$, M is at least one element selected from Fe, V, Mo and Ta, and the like. Specifically, it may include $Nb_2TiO_7$ whose lithium insertion and extraction voltage is nobler than 1.0 V (vs. $Li/Li^+$).

The sodium-niobium-titanium oxide may include, for example, orthorhombic Na-containing niobium titanium composite oxides, represented by the general formula: $Li_{2+v}Na_{2-w}M1_xTi_{6-y-z}Nb_yM2_zO_{14+\delta}$ where $0 \leq w \leq 4$, $0<w<2$, $0 \leq x<2$, $0<y<6$, $0 \leq z<3$, $-0.5 \leq \delta \leq 0.5$, M1 includes at least one element selected from Cs, K, Sr, Ba and Ca, and M2 includes at least one element selected from Zr, Sn, V, Ta, Mo, W, Fe, Co, Mn and Al.

The silicon oxide may include, for example, SiO, Si—SiO composite, and the like.

The metal sulfide may include, for example, $TiS_2$, FeS, $FeS_2$, NiS, $MoS_2$, and the like.

It is possible to use, as the alloy, lithium alloy, silicon alloy, and the like. The lithium alloy preferably contains at least one metal element selected from the group consisting of Si, Al, Zn, Sn and In. Specific examples thereof may include, Li—Al, Li—Bi—Cd, Li—Sn—Cd, and the like. The silicon alloy may include, for example, Si—Sn, Si—Li, and the like.

The negative electrode active materials may be used alone or as a mixture of two or more kinds.

The negative electrode active material is included in the state of a particle in the negative electrode. The negative electrode active material particles may be individual primary particles, secondary particles in which the primary particles are aggregated, or a mixture of individual primary particles and secondary particles. The shape of the particle is not particularly limited, and may be, for example, a spheroidal, elliptical, flat, or fiber shape, and the like.

A conductive agent is added in order to increase the current-collecting performance and to suppress the contact resistance between the negative electrode active material and the current collector. Examples of the conductive agent include carbonaceous materials such as vapor grown carbon fiber (VGCF), acetylene black, carbon black, and graphite. The conductive agents may be used alone or as a mixture of two or more kinds. Alternatively, instead of using the conductive agent, carbon coating or electron conductive inorganic material coating may be performed on surfaces of negative electrode active material particles.

A binder is added in order to fill a gap between dispersed negative electrode active materials and to bind the negative electrode active material and the negative electrode current collector. Examples of the binder include polytetrafluoro ethylene (PTFE), polyvinylidene fluoride (PVdF), fluoro-rubber, styrene-butadiene rubber, polyacrylic acid compounds, and imide compounds. The binders may be used alone or as a mixture of two or more kinds.

It is preferable that the active material, the conductive agent, and the binder in the negative electrode active material layer are respectively added in a proportion within a range of 68% by mass to 96% by mass, 2% by mass to 30% by mass, and 2% by mass to 30% by mass. When the content of the conductive agent is 2% by mass or more, the current-collecting performance of the negative electrode active material layer can be improved. In addition, when the content of the binder is 2% by mass or more, the binding property between the negative electrode active material layer and the negative electrode current collector is sufficient, and the excellent cycle performance can be expected. On the other hand, in order to make the capacity higher, it is preferable that the contents of the conductive agent and the binder are respectively 28% by mass or less.

It is preferable that the density of the negative electrode active material layer (not including the current collector) is within a range of 1.8 $g/cm^3$ to 2.8 $g/cm^3$. The negative electrode, in which the density of the negative electrode active material layer is within this range, is excellent in terms of energy density and holding property of the non-aqueous electrolyte. It is more preferable that the density of the negative electrode active material layer is within a range of 2.1 $g/cm^3$ to 2.6 $g/cm^3$.

When the electrode structure is uses as the positive electrode, the current collector and the active material layer may have, for example, the following structure.

The positive electrode current collector is preferably an aluminum foil, or an aluminum alloy foil containing at least one element selected from Mg, Ti, Zn, Ni, Cr, Mn, Fe, Cu, and Si.

The aluminum foil or the aluminum alloy foil has preferably a range of 5 μm to 20 μm, more preferably 15 μm or less. The aluminum foil has preferably a density of 99% by mass or more. The content of the transition metal, such as iron, copper, nickel, and chromium, which is included in the aluminum foil or the aluminum alloy foil, is preferably 1% by mass or less.

It is possible to use a substance allowing lithium to be inserted and extracted for the positive electrode active material. The positive electrode may contain one kind of the positive electrode active material or may contain two or more kinds of the positive electrode active materials. Examples of the positive electrode active material may include lithium-manganese composite oxides, lithium-nickel composite oxides, lithium-cobalt-aluminum composite oxides, lithium-nickel-cobalt-manganese composite oxides, spinel lithium-manganese-nickel composite oxides, lithium-manganese-cobalt composite oxides, lithium-iron oxide, lithium-iron fluorinated sulfate, phosphate compounds having an olivine crystal structure (for example, $Li_xFePO_4$ where $0<x\leq1$, and $Li_xMnPO_4$ where $0<x\leq1$), and the like. The phosphate compound having the olivine crystal structure has the excellent thermal stability.

Examples of the positive electrode active material capable of providing a high positive electrode potential may include lithium manganese composite oxides such as $Li_xMn_2O_4$, where $0<x\leq1$, having a spinel structure, and $Li_xMnO_2$ where $0<x\leq1$; lithium-nickel-aluminum composite oxides such as $Li_xNi_{1-y}Al_yO_2$ where $0<x\leq1$ and $0<y<1$; lithium-cobalt composite oxides such as $Li_xCoO_2$ where $0<x\leq1$; lithium nickel cobalt composite oxides such as $Li_xNi_{1-y-z}Co_yMn_zO_2$ where $0<x1$, $0<y<1$, and $0\leq z<1$; lithium-manganese-cobalt composite oxides such as $Li_xMn_yCo_{1-y}O_2$ where $0<x\leq1$ and $0<y<1$; spinel lithium-manganese-nickel composite oxides such as $Li_xMn_{2-y}Ni_yO_4$ where $0<x<1$ and $0<y<2$; lithium-phosphorus oxides having an olivine structure such as $Li_xFePO_4$ where $0<x\leq1$, $Li_xFe_{1-y}Mn_yPO_4$ where $0<x\leq1$ and $0\leq y\leq1$, $Li_xCoPO_4$ where $0<x\leq1$; and iron fluorinated sulfate such as $Li_xFeSO_4F$ where $0<x\leq1$. The positive electrode active materials may be used alone or as a mixture of two or more kinds.

The positive electrode active material is included in the state of a particle in the positive electrode. The positive electrode active material particles may be individual primary particles, secondary particles in which the primary particles are aggregated, or a mixture of individual primary particles and secondary particles. The shape of the particle is not particularly limited, and may be, for example, a spheroidal, elliptical, flat, or fiber shape, and the like.

A conductive agent is added in order to increase the current-collecting performance and to suppress the contact resistance between the positive electrode active material and the positive electrode current collector. Examples of the conductive agent include carbonaceous materials such as vapor grown carbon fiber (VGCF), acetylene black, carbon black, and graphite. The conductive agents may be used alone or a mixture of two or more kinds.

A binder is added in order to fill a gap between dispersed positive electrode active materials and to bind the positive electrode active material and the positive electrode current collector. Examples of the binder include polytetrafluoro ethylene (PTFE), polyvinylidene fluoride (PVdF), fluororubber, polyacrylic acid compounds, and imide compounds. The binders may be used alone or as a mixture of two or more kinds.

It is preferable that the positive electrode active material and the binder in the positive electrode active material layer are respectively added in a proportion within a range of 80% by mass to 98% by mass and 2% by mass to 20% by mass.

When the content of the binder is 2% by mass or more, sufficient electrode strength can be obtained. In addition, when the content of the binder is 20% by mass or less, the content of an insulating material included in the electrode is reduced, and thus, internal resistance can be reduced.

If the conductive agent is added, it is preferable that the positive electrode active material, the binder, and the conductive agent are respectively added in a proportion within a range of 77% by mass to 95% by mass, 2% by mass to 20% by mass, and 3% by mass to 15% by mass.

When the content of the conductive agent is 3% by mass or more, the above-described effect can be exhibited. In addition, when the content of the conductive agent is 15% by mass or less, the ratio of the conductive agent brought into contact with the nonaqueous electrolyte can be reduced. When the ratio is low, decomposition of the nonaqueous electrolyte can be reduced under high-temperature preservation.

The positive electrode active material layer has preferably a density within a range of 2.5 g/cm$^3$ to 4.0 g/cm$^3$.

The separator layer has, for example, a thickness of 1 µm to 30 µm. The separator layer has preferably a thickness of 20 µm or less.

The separator layer may include, for example, an inorganic material, solid electrolyte, and a binder.

As the inorganic material, it is possible to use insulating or dielectric materials. Examples thereof may include titanium oxide, titanium hydroxide, barium titanate, alumina, iron oxide, silicon oxide, aluminum hydroxide, gibbsite, boehmite, bayerite, magnesium oxide, silica, zirconium oxide, magnesium hydroxide, silica, barium titanate, lithium tetraborate, lithium tantalate, mica, silicon nitride, aluminum nitride, zeolite, and the like. The inorganic materials may be used alone or as a mixture of two or more kinds of compounds.

The solid electrolyte is, for example, inorganic solid particles having Li ion conductivity. The solid electrolytes may be used alone or as a mixture of two or more kinds.

The solid electrolyte is, for example, at least one oxide selected from the group consisting of LATP ($Li_{1+x}Al_xTi_{2-x}(PO_4)_3$) ($0.1 \leq x \leq 0.4$) having a NASICON type skeleton, amorphous LIPON ($Li_{2.9}PO_{3.3}N_{0.46}$), and garnet type LLZ ($Li_7La_3Zr_2O_{12}$).

As the inorganic solid particle having the Li ion conductivity, it is preferable to use inorganic solid particles having a garnet structure, because it has the high lithium ion conductivity, the reduction resistance, and wide electrochemical window. The inorganic solid particles having the garnet structure may include $La_{5+x}A_xLa_{3-x}M_2O_{12}$ (where A is at least one element of Ca, Sr, and Ba, and M is at least one of Nb and Ta), $Li_3M_{2-x}L_2O_{12}$ (where M is at least one of Ta and Nb, and L includes Zr), $Li_{7-3x}Al_xLa_3Zr_3O_{12}$, and $Li_7La_3Zr_2O_{12}$. x is preferably within a range of 0 to 0.5.

Of these, $Li_{6.25}Al_{0.25}La_3Zr_3O_{12}$ and $Li_7La_3Zr_2O_{12}$ are preferable, because they have the high Li ion conductivity and are electrochemically stable, and thus they have the excellent discharge performance and cycle life time performance. Further, when the inorganic solid particles having the compositions described above are used together with a nonaqueous electrolytic solution as described below, they are chemically stable against an organic solvent even if they are pulverized into fine particles.

The binder is, for example, at least one compound selected from the group consisting of carboxymethyl cellulose (CMC), hydroxpropylmethyl cellulose (HPMC) cellulose acetate, cellulose ammonium salt, polytetrafluoroethylene (PTFE), polyvinylidene fluoride (PVdF), fluororubber, styrene-butadiene rubber, polyacrylic acid compounds, polyamidoimide, and imide compounds.

When the binder described above is used, the adhesive property between the active material layer and the separator layer can be improved, whereby the strength of the electrode can be improved.

When the solid electrolyte is used for the separator layer, the liquid nonaqueous electrolyte may not be used. However, in order to further improve the ion conductivity, liquid nonaqueous electrolyte containing an electrolyte salt and an organic solvent, or gel nonaqueous electrolyte in which liquid nonaqueous electrolyte is combined with a polymer material may be used. The liquid nonaqueous electrolyte and/or the gel nonaqueous electrolyte can be contained, for example, in the separator layer. When the solid electrolyte is used for the separator layer, it is possible to form a bipolar battery.

It is preferable that the liquid nonaqueous electrolyte is dissolved an electrolyte salt in an organic solvent in a concentration of 0.5 mol/L to 2.5 mol/L.

Examples of the electrolyte salt may include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethansulfonate ($LiCF_3SO_3$), and lithium bistrifluoromethylsulfonylimide ($LiN(CF_3SO_2)_2$), and mixtures thereof. The electrolyte salt which is not easily oxidized even at a high potential is preferable, and $LiPF_6$ is most preferable.

Examples of the organic solvent may include cyclic carbonates such as propylene carbonate (PC), ethylene carbonate (EC), and vinylene carbonate; linear carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); linear ethers such as dimethoxyethane (DME) and diethoxyethane (DEE); γ-butyrolactone (GBL), acetonitrile (AN), and sulfolane (SL). The organic solvents may be used alone or as a mixed solvent.

The gel nonaqueous electrolyte is prepared by combining liquid nonaqueous electrolyte with a polymer material. Examples of the polymer material include polyvinylidene fluoride (PVdF), polyacrylonitrile (PAN), polyethylene oxide (PEO), or mixtures thereof.

Alternatively, as the nonaqueous electrolyte, an ambient-temperature molten salt (ionic melt) containing Li ions may be used.

The ambient-temperature molten salt (ionic melt) refers to a compound which can exist as liquid at an ambient temperature (15 to 25° C.) in organic salts in which an organic cation and an organic anion are combined. Examples of the ambient-temperature molten salt includes ambient-temperature molten salts which exist as a liquid, ambient-temperature molten salts which turn into liquid by mixing it with electrolyte salt, and ambient-temperature molten salts which turn into liquid by dissolving it in an organic solvent. The ambient-temperature molten salt, which is generally used in the nonaqueous electrolyte battery, has a melting point of 25° C. or lower. In addition, the organic cation has generally a quaternary ammonium saltskeleton.

The electrode structure according to the embodiment can be produced, for example, as described below.

A method of forming the active material layer provided on the current collector is not particularly limited, and the active material layer can be formed on one side or both sides of the current collector according to a conventionally known method.

In order to provide the separator layer on the active material layer, the inorganic material and/or the solid electrolyte, and the binder described above are first prepared. Subsequently, these are suspended in an appropriate solvent such as N-methyl-2-pyrrolidone (NMP) or the like to prepare a slurry for forming the separator layer. The slurry is coated on the previously formed active material layer.

Examples of the method of coating the slurry for forming the separator layer include gravure printing, a spray deposition method, a slot die method, micro gravure printing, electrospinning, and the like. The coating of the slurry for forming the separator layer may be performed by only one of these coating methods or a combination of plural kinds of coating methods.

When the slurry for forming the separator layer is coated on the active material layer, the separator layer is provided so that the thickness $T_{OE}$ of the separator layer provided on the outer edge region of the principal surface of the active material layer is larger than the thickness $T_C$ of the separator layer provided on the central region of the principal surface of the active material layer.

The method of forming the separator layer is not particularly limited as long as the separator layer is formed so that the ratio $T_{OE}/T_C$ is larger than 1. For example, by using the slurry for forming the separator layer, a part of the separator layer is formed by coating the slurry on the active material layer by micro gravure printing, so that the ratio $T_{OE}/T_C$ is 1 or less, and drying the slurry. Then, as a subsequent step, the slurry having the same composition as the previous slurry is used to form another part of the separator layer by a spray deposition method, so that the ratio $T_{OE}/T_C$ is larger than 1.

That is, the forming of the separator layer may be performed by coating the slurry only once, or may be performed by coating the slurry twice or more times. When the slurry is coated twice or more times, the first coating method and the second coating method may be identical to or different from each other. In addition, a composition of the slurry used for the first coating and a composition of the slurry used for the second coating may be identical to or different from each other.

The electrode structure according to the first embodiment includes a current collector, an active material layer provided on at least one surface of the current collector, and a separator layer provided on the active material layer. The separator layer includes a first region, and a second region which is adjacent to the first region and exists in the inside of the first region. The outline of the principal surface of the active material layer overlaps the first region of the separator layer, and a thickness of at least a part of the first region of the separator layer is thicker than a thickness of the second region of the separator layer. Therefore, the electrode structure can achieve the excellent cycle life time property.

Second Embodiment

According to a second embodiment, a secondary battery is provided. The secondary battery includes the electrode structure according to the first embodiment. The secondary battery includes, for example, the electrode structure as a negative electrode, and a positive electrode. The secondary battery may further include a container member which houses the electrode structure and the liquid nonaqueous electrolyte above described. In addition, the secondary battery may further include a negative electrode terminal electrically connected to the negative electrode and a positive electrode terminal electrically connected to the positive electrode.

When the electrode structure is used as the negative electrode or the positive electrode, the current collector, the active material, and the like described in the first embodiment can be used.

The container member, the negative electrode terminal, and the positive electrode terminal, which can be used for the secondary battery according to the present embodiment, will be described.

(Container Member)

As the container member, for example, a laminate film or a metal container can be used.

Examples of the shapes of the container member may include a flat-type (a thin-type), a square-type, a cylindrical type, a coin-type, a button-type, a sheet-type, a laminate-type, and the like. The container member may have a size according to a battery size. The container member has a size used for, for example, a compact battery loaded on a portable electronic device, or a large size battery loaded on vehicles such as two-wheeled to four-wheeled automobiles or rail way vehicles.

As the laminate film, a multilayer film in which a metal layer is disposed between resin films is used. The laminate film has preferably a thickness of 0.2 mm or less. An aluminum foil or an aluminum alloy foil is preferably used as the metal layer, in order to reduce the weight. As the resin film, it is possible to use a polymer material such as polypropylene (PP), polyethylene (PE), nylon, or polyethylene terephthalate (PET). The laminate film can be sealed by heat seal to form into a shape of the container member sealing the film by heat seal.

The metal container has preferably a thickness of 0.5 mm or less, more preferably 0.2 mm or less.

The metal container is, for example, formed from aluminum, aluminum alloy, or the like. The aluminum alloy preferably contains an element of magnesium, zinc, silicon, or the like. When the alloy contains a transition metal such as iron, copper, nickel, or chromium, the content thereof is preferably adjusted to 100 ppm or less, whereby the long-term reliability in an environment of high temperatures and the heat dissipation can be dramatically improved.

(Positive Electrode Terminal)

The positive electrode terminal is formed from a material that is electrochemically stable in a potential range of 3.0 V to 4.5 V relative to oxidation and reduction potentials of lithium (vs. Li/Li$^+$) and has a conductive property. The material of the positive electrode terminal may include aluminum, or aluminum alloy containing at least one element selected from Mg, Ti, Zn, Mn, Fe, Cu, and Si. In order to reduce the contact resistance between the positive electrode terminal and the positive electrode current collector, it is preferable that the positive electrode terminal is formed from the same material as that of the positive electrode current collector.

(Negative Electrode Terminal)

The negative electrode terminal can be formed from a material that is electrochemically stable at lithium insertion and extraction potentials of the negative active material and has a conductive property. Specifically, the material of the negative electrode terminal may include copper, nickel, stainless steel or aluminum, or aluminum alloy containing at least one element selected from Mg, Ti, Zn, Mn, Fe, Cu, and Si. It is preferable to use aluminum or aluminum ally as the material of the negative electrode terminal. In order to reduce the contact resistance between the negative electrode terminal and the negative electrode current collector, it is preferable that the negative electrode terminal is formed from the same material as that of the negative electrode current collector.

Next, some examples of the secondary batteries according to the present embodiment will be described with reference to the drawings.

Figure 4:
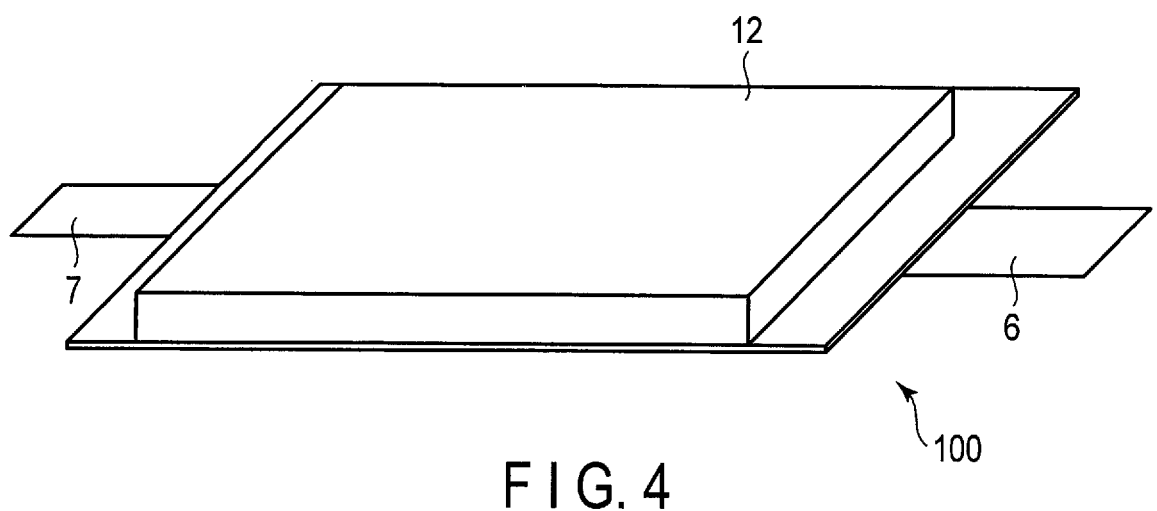
FIG. 4 is a perspective view schematically showing one example of secondary batteries according to a second embodiment.
Figure 5:
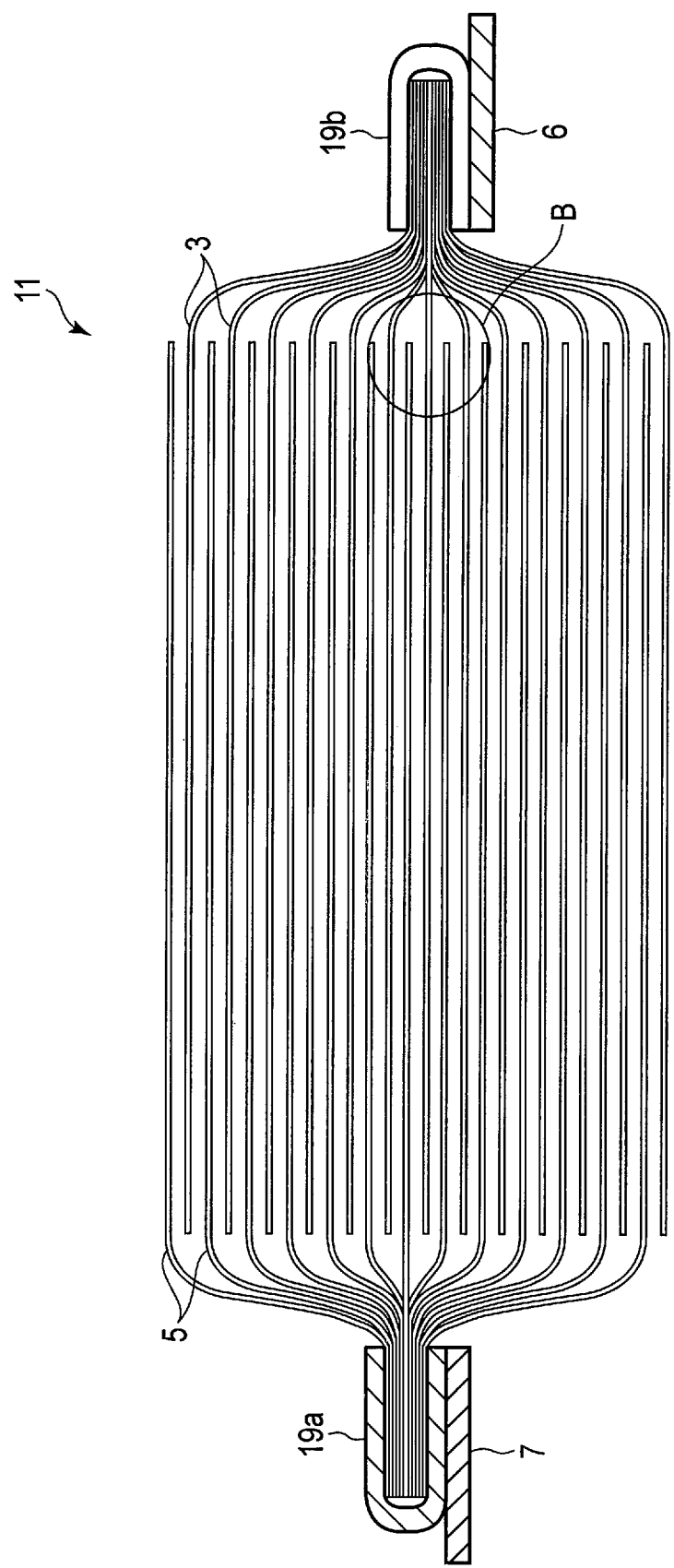
FIG. 5 is a cross-sectional view showing one example of laminated electrode groups included in the secondary battery shown in FIG. 4.

First, referring to FIGS. 4 to 6, a laminate secondary battery, which is one of the secondary batteries according to the present embodiment, is explained.

FIG. 4 is a perspective view schematically showing one example of the secondary batteries according to the present embodiment. FIG. 5 is a schematic view showing a laminated electrode group 11 included in the secondary battery shown in FIG. 4. FIG. 6 is an enlarged cross-sectional view showing a part B of the electrode group 11 shown in FIG. 5.

The secondary battery 100 shown in FIGS. 4 to 6 includes the laminated electrode group 11. The laminated electrode group 11 is housed in a container member 12 formed from a laminate film in which a metal layer is disposed between two resin films. As shown in FIG. 5, the laminated electrode group 11 has a structure in which positive electrodes 5 and negative electrodes 3 are alternately laminated.

Current collecting tabs of the positive electrodes 5 are bound into one by ultrasonic welding and held by a holding member 19a. In addition, current collecting tabs of the negative electrodes 3 are bound into one by ultrasonic welding and held by a holding member 19b. A positive electrode terminal 7 and a negative electrode terminal 6 are electrically connected to the holding members 19a and 19b, respectively. A tip of the belt-shaped negative electrode terminal 6 is drawn outward from the container member 12. In addition, a tip of the belt-shaped positive electrode terminal 7 is located on the opposite side to the negative electrode terminal 6 and is drawn outward from the edge of the container member 12.

As shown in FIG. 6, the electrode group 11 includes multiple positive electrodes 5. Each of the positive electrodes 5 includes a positive electrode current collector 5a and positive electrode active material layers 5b supported on both sides of the positive electrode current collector 5a. In addition, the electrode group 11 includes multiple negative electrodes 3. Each of the negative electrodes 3 includes a negative electrode current collector 3a, negative electrode active material layers 3b, and negative electrode separator layers 3c. The negative electrode active material layers 3b and the negative electrode separator layers 3c are supported on both sides of the negative electrode current collector 3a in this order. A layer thickness of the outer edge region of the negative electrode separator layer 3c is thicker than a layer thickness of the central part thereof.

The negative electrode current collector 3a included in each of the negative electrodes 3 protrudes from one edge thereof. The protruding negative electrode current collectors 3a are held by the holding member 19b as described above. In addition, although not shown, in the positive electrode current collector 5a included in each of the positive electrodes 5, the edge from which the negative electrode current collector 3a protrudes and the edge located on the opposite side protrude from the positive electrode 5. The protruding positive electrode current collectors 5a are held by the holding member 19a as described above.

Figure 7:
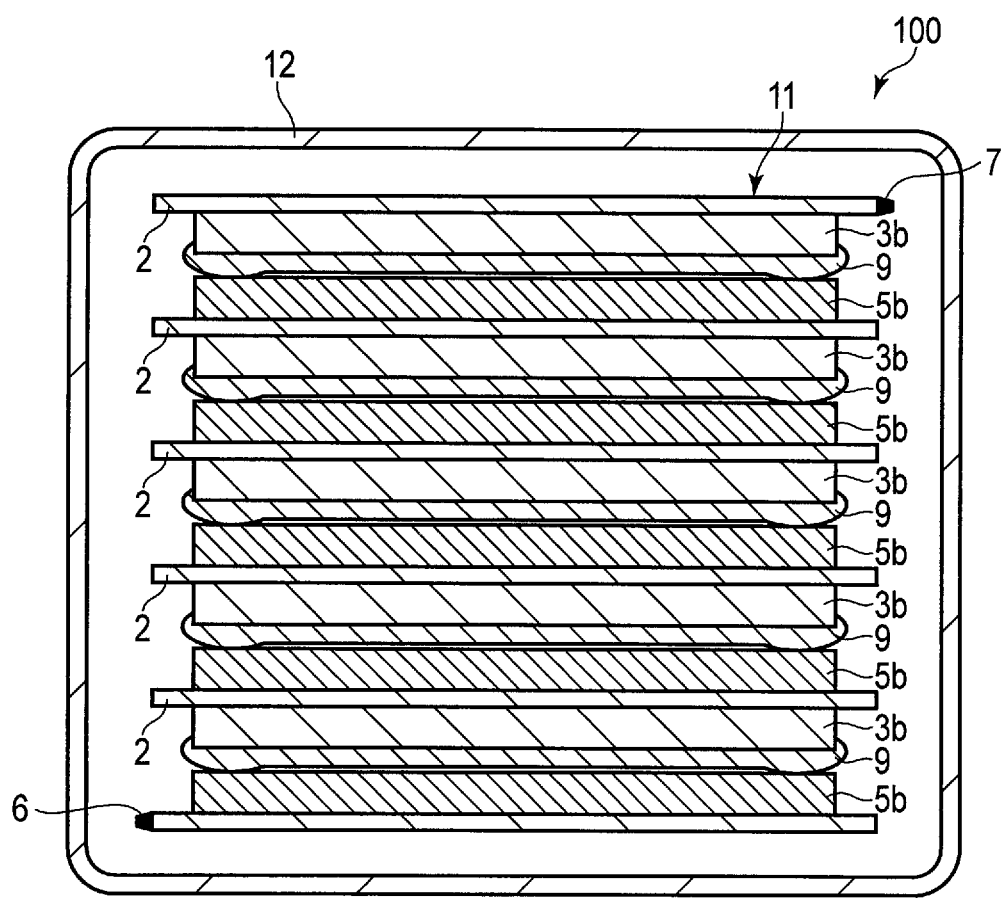
FIG. 7 is a cross-sectional view schematically showing another example of the secondary batteries according to the second embodiment.

The secondary battery according to the present embodiment may include a bipolar electrode structure shown in FIG. 7 as another aspect.

The secondary battery 100 shown in FIG. 7 is constituted as follows.

The secondary battery 100 includes an electrode group 11 and a container member 12 which houses the electrode group 11.

The electrode group 11 includes a first laminate in which a positive electrode active material layer 5b is formed on one surface of a current collector 2 and a negative electrode active material layer 3b is formed on the other surface thereof. A separator layer 9 is formed on the negative electrode active material layer 3b included in the first laminate. In the separator layer 9, a layer thickness of a portion facing the outer edge region of the principal surface of the negative electrode active material layer 3b is thicker than a layer thickness of a portion facing the central region of the principal surface of the negative electrode active material layer 3b.

In addition, a second laminate included in one end portion of the electrode group 11, for example, an upper end portion shown in FIG. 7, is a laminate in which the negative electrode active material layer 3b and the separator layer 9 are provided in this order on one surface of the current collector 2. A positive electrode terminal 7 is electrically connected to the current collector 2 included in the second laminate. Although not shown, the positive electrode terminal 7 is drawn outward from the container member 12.

In addition, a third laminate included in the other end portion of the electrode group 11, for example, a lower end portion shown in FIG. 7, is a laminate in which the positive electrode active material layer 5b is provided on one surface of the current collector 2. A negative electrode terminal 6 is electrically connected to the current collector 2 included in the third laminate. Although not shown, the negative electrode terminal 6 is drawn outward from the container member 12.

The electrode group 11 having the bipolar electrode structure shown in FIG. 7 is configured by laminating a second laminate, multiple first laminates, and a third laminate in this order. The number of the first laminates can be appropriately changed according to battery design.

The secondary battery having the bipolar electrode structure is compact and has a high capacity and can achieve the excellent life time performance, thermal stability, and electrochemical stability.

The secondary battery according to the present embodiment may include an electrode group having a wound structure described below, instead of the electrode group having the laminated structure.

Figure 8:
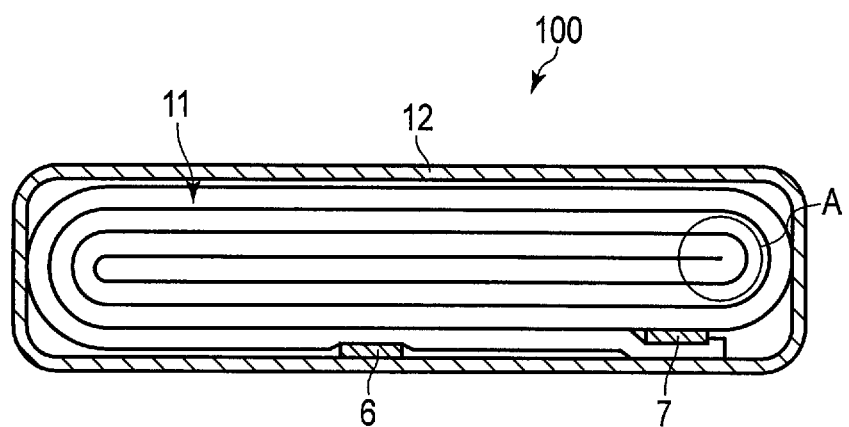
FIG. 8 is a cross-sectional view schematically showing another example of the secondary batteries according to the second embodiment.
Figure 9:
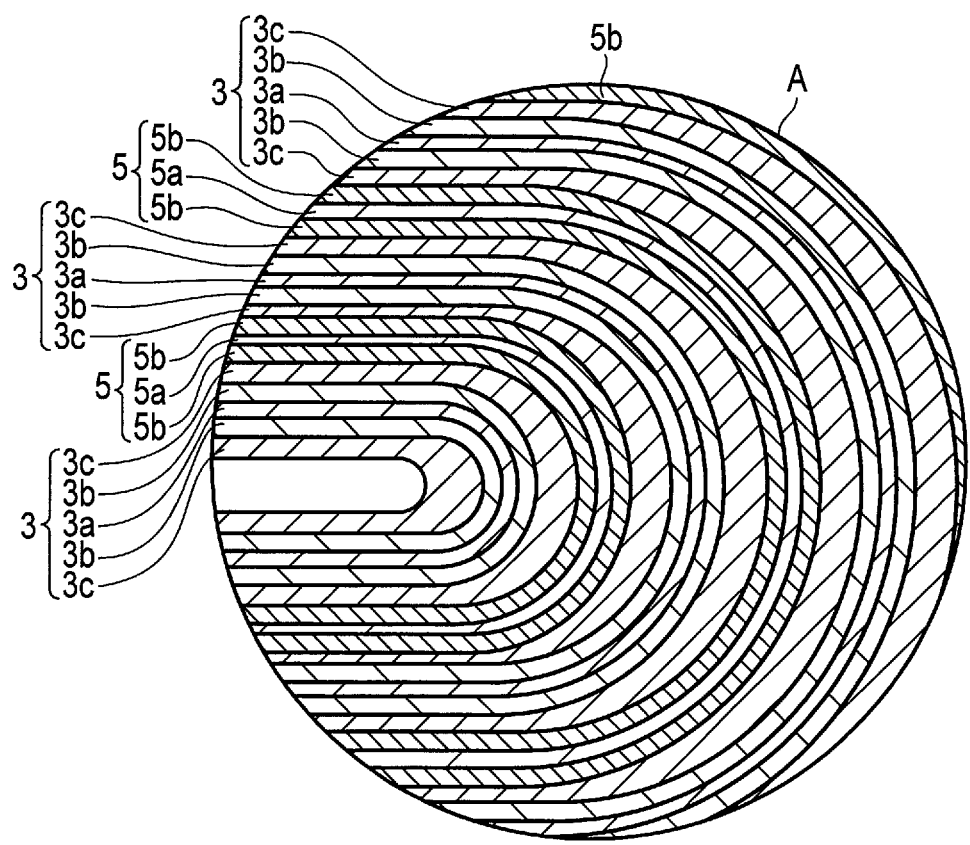
FIG. 9 is an enlarged cross-sectional view showing a part A in FIG. 8.

FIG. 8 is a cross-sectional view schematically showing another example of the secondary batteries according to the second embodiment. FIG. 9 is an enlarged cross-sectional view showing a part A of the secondary battery shown in FIG. 8.

The secondary battery 100 shown in FIG. 8 and FIG. 9 includes a bag-shaped container member 12 shown in FIG. 8 and an electrode group 11 shown in FIG. 8 and FIG. 9. The electrode group 11 is housed in the container member 12.

The bag-shaped container member 12 is formed from a laminate film including two resin layers and a metal layer disposed therebetween.

As shown in FIG. 8, the electrode group 11 is a flat wound electrode group. The flat wound electrode group 11 includes negative electrodes 3 and positive electrodes 5 as shown in FIG. 9.

The negative electrode 3 includes a negative electrode current collector $3a$, negative electrode active material-containing layers $3b$, and negative electrode separator layers $3c$. The negative electrode active material-containing layers $3b$ and the negative electrode separator layers $3c$ are formed in this order on both sides of the negative electrode current collector $3a$.

The positive electrode 5 includes a positive electrode current collector $5a$ and positive electrode active material-containing layers $5b$ formed on both sides thereof.

A negative electrode terminal 6 and a positive electrode terminal 7 are located in the vicinity of the outer peripheral end of the wound electrode group 11. The negative electrode terminal 6 is connected to a part of the negative electrode current collector $3a$ of the negative electrode 3 located at the outermost shell. In addition, the positive electrode terminal 7 is connected to the positive electrode current collector $5a$ of the positive electrode 5 located at the outermost shell. The negative electrode terminal 6 and the positive electrode terminal 7 extend outward from an opening of the bag-shaped container member 12.

As shown in FIG. 9, the negative electrode separator layer $3c$ is formed to have a relatively thin layer thickness in a flat portion of the wound electrode group. On the other hand, the negative electrode separator layer $3c$ is formed to have a relatively thick layer thickness in a curved portion of the wound electrode group. That is, an average thickness of the negative electrode separator layer $3c$ in the curved portion is thicker than an average thickness of the negative electrode separator layer $3c$ in the flat portion. According to such a configuration, the electrode breakage of the negative electrode active material layer $3b$ in the curved portion can be inhibited. Therefore, the secondary battery having the wound electrode group shown in FIG. 8 and FIG. 9 can achieve the excellent cycle life time property.

The secondary battery according to the embodiment may form a battery module. The battery module includes, for example, plural of the secondary battery according to the embodiment.

In the battery module according to the embodiment, each of the battery cells may be arranged electrically connected in series, in parallel, or in a combination of in-series connection and in-parallel connection.

An example of the battery module according to the embodiment will be described with reference to the drawings.

FIG. 10 is a perspective view schematically showing an example of the battery module according to the embodiment. A battery module 200 shown in FIG. 10 includes five battery cells 100, four bus bars 21, a positive electrode-side lead 22, and a negative electrode-side lead 23. Each of the five battery cells 100 is a secondary battery according to the embodiment.

Each bus bar 21 connects a negative electrode terminal 6 of one battery cell 100 and a positive electrode terminal 7 of the another battery cell 100 positioned adjacent. The five battery cells 100 are thus connected in series by the four bus bars 21. That is, the battery module 200 shown in FIG. 10 is a battery module of five in-series connection.

As shown in FIG. 10, the positive electrode terminal 7 of the battery cell 100 located at one end on the left among the row of the five battery cells 100 is connected to the positive electrode-side lead 22 for external connection. In addition, the negative electrode terminal 6 of the battery cell 100 located at the other end on the right among the row of the five battery cells 100 is connected to the negative electrode-side lead 23 for external connection.

The secondary battery according to the second embodiment includes the electrode structure according to the first embodiment. Therefore, the secondary battery can inhibit the electrode breakage and can achieve the excellent cycle life time property.

Third Embodiment

According to a third embodiment, a battery pack is provided. The battery pack includes, for example, a single secondary battery or a battery module configured by the plural of the secondary battery.

The battery pack may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the third embodiment will be described with reference to the drawings.

Figure 11:
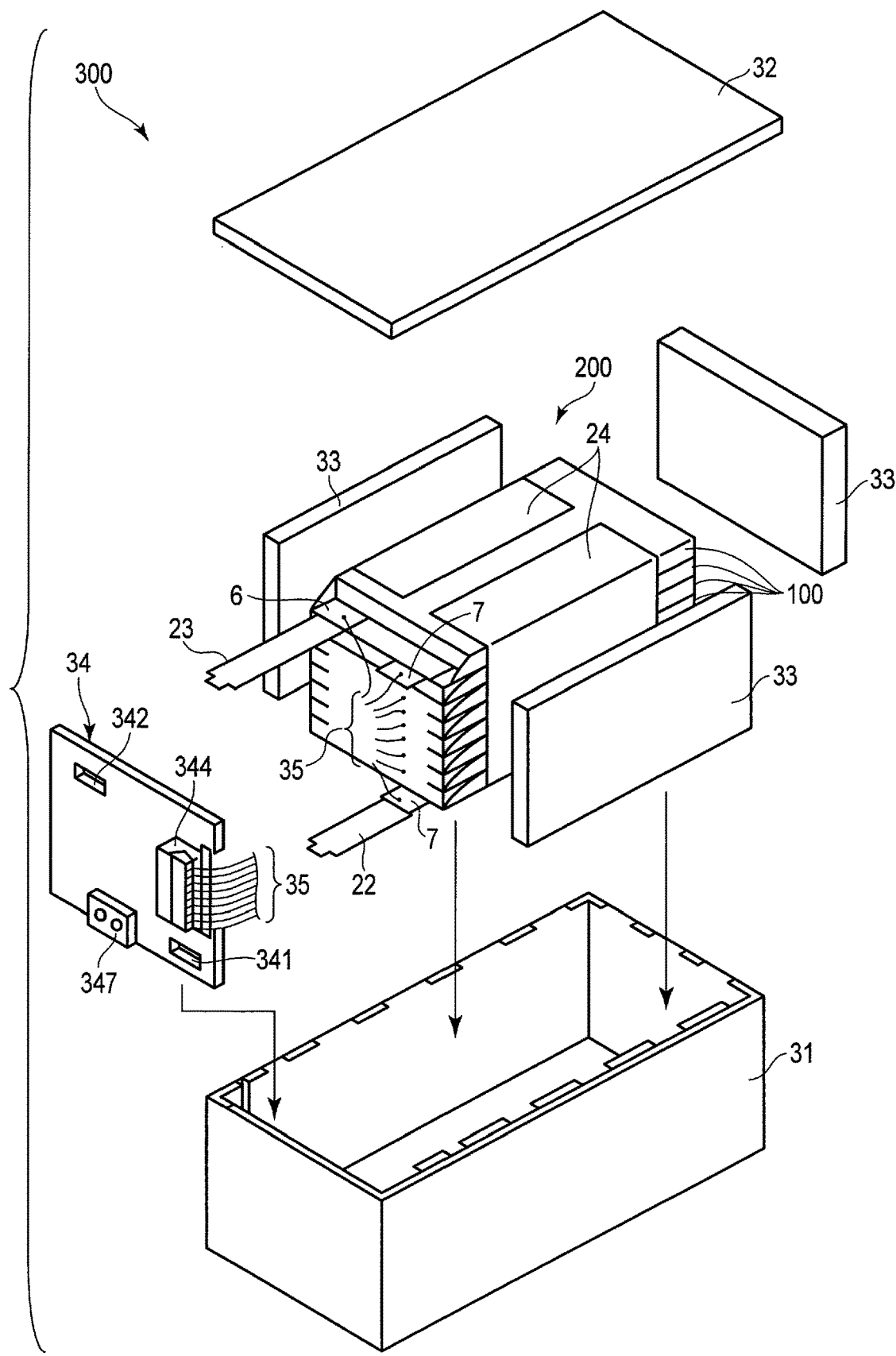
FIG. 11 is an exploded perspective view schematically showing one example of battery packs according to a third embodiment.

FIG. 11 is an exploded perspective view schematically showing an example of the battery pack according to the third embodiment. FIG. 12 is a block diagram showing an example of an electric circuit of the battery pack shown in FIG. 11.

A battery pack 300 shown in FIGS. 11 and 12 includes a housing container 31, a lid 32, protective sheets 33, a battery module 200, a printed wiring board 34, wires 35, and an insulating plate (not shown).

The housing container 31 is configured to house the protective sheets 33, the battery module 200, the printed wiring board 34, and the wires 35. The lid 32 covers the housing container 31 to house the battery module 200 and the like. Although not shown, opening(s) or connection terminal(s) for connecting to external device(s) and the like are provided on the housing container 31 and lid 32.

The protective sheets 33 are arranged on both inner surfaces of the housing container 31 along the long-side direction and on one inner surface of the housing container 31 along the short-side direction. The printed wiring board 34 is arranged on the other inner surface of the housing container 31 along the short-side direction. The protective sheets 33 are made of, for example, resin or rubber.

The battery module 200 includes plural battery cells 100, a positive electrode-side lead 22, a negative electrode-side lead 23, and an adhesive tape 24. The battery module 200 may alternatively include only one battery cell 100.

The battery cell 100 has, for example, a structure shown in FIGS. 4 to 6. At least one of the plural battery cells 100 is a secondary battery according to the second embodiment. The plural battery cells 100 are stacked such that the negative electrode terminals 6 and the positive electrode terminals 7, which extend outside, are directed toward the same direction. The plural battery cells 100 are electrically connected in series, as shown in FIG. 12. The plural battery cells 100 may alternatively be electrically connected in parallel, or connected in a combination of in-series connection and in-parallel connection. If the plural battery cells 100 are connected in parallel, the battery capacity increases as compared to a case in which they are connected in series.

The adhesive tape 24 fastens the plural battery cells 100. The plural battery cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural battery cells 100.

One end of the positive electrode-side lead 22 is connected to the positive electrode terminal 7 of the battery cell 100 located lowermost in the stack of the battery cells 100. One end of the negative electrode-side lead 23 is connected to the negative electrode terminal 6 of the battery cell 100 located uppermost in the stack of the battery cells 100.

The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each battery cell 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural battery cells 100 via the wires 35.

The protective circuit 344 controls charge and discharge of the plural battery cells 100. The protective circuit 344 is also configured to cut-off electric connection between the protective circuit 344 and the external power distribution terminal 347, based on detection signals transmitted from the thermistor 343 or detection signals transmitted from each battery cell 100 or the battery module 200.

An example of the detection signal transmitted from the thermistor 343 is a signal indicating that the temperature of the battery cell(s) 100 is detected to be a predetermined temperature or more. An example of the detection signal transmitted from each battery cell 100 or the battery module 200 is a signal indicating detection of over-charge, over-discharge, and overcurrent of the battery cell(s) 100. When detecting over-charge or the like for each of the battery cells 100, the battery voltage may be detected, or a positive electrode potential or negative electrode potential may be detected. In the latter case, a lithium electrode to be used as a reference electrode may be inserted into each battery cell 100.

Note, that as the protective circuit 344, a circuit included in a device (for example, an electronic device or an automobile) that uses the battery pack 300 as a power source may be used.

Such a battery pack 300 is used, for example, in applications where excellent cycle performance is demanded when a large current is extracted. More specifically, the battery pack 300 is used as, for example, a power source for electronic devices, a stationary battery, an onboard battery for vehicles, or a battery for railway cars. An example of the electronic device is a digital camera. The battery pack 300 is particularly favorably used as an onboard battery.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of a motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

The battery pack according to the third embodiment includes the secondary battery according to the second embodiment. Therefore, the battery pack can inhibit the electrode breakage and achieve the excellent cycle life time property.

Fourth Embodiment

According to a fourth embodiment, a vehicle is provided. The battery pack according to the third embodiment is installed on this vehicle.

In the vehicle according to the fourth embodiment, the battery pack is configured, for example, to recover regenerative energy from motive force of the vehicle.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

An example of the vehicle according to the embodiment is explained below, with reference to the drawings.

FIG. 13 is a cross-sectional view schematically showing an example of a vehicle according to the embodiment.

A vehicle 400, shown in FIG. 13 includes a vehicle body 40 and a battery pack 300 according to the embodiment. In FIG. 13, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

The battery pack 300 is installed in an engine compartment located at the front of the vehicle body 40. The location of installing the battery pack 300 is not particularly limited. The battery pack 300 may be installed in rear sections of the vehicle body 40, or under a seat. The battery pack 300 may be used as a power source of the vehicle 400.

Figure 14:
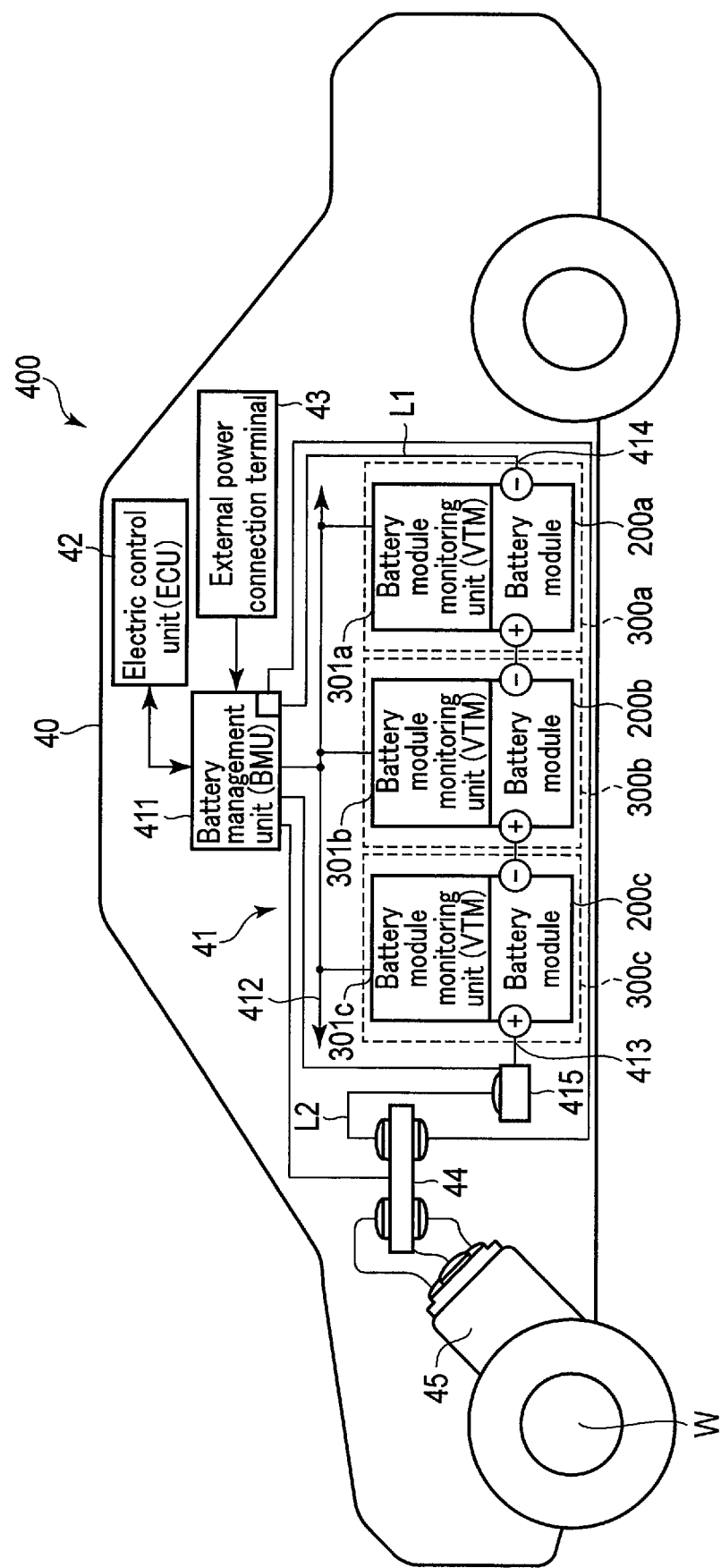
FIG. 14 is a view schematically showing another example of the vehicle according to the fourth embodiment.

Next, with reference to FIG. 14, an aspect of operation of the vehicle according to the embodiment is explained. FIG. 14 is a view schematically showing another example of the vehicle according to the embodiment. A vehicle 400, shown in FIG. 14, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 14, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The three battery packs 300a, 300b and 300c are electrically connected in series. The battery pack 300a includes a battery module 200a and a battery module monitoring unit (for example, voltage temperature monitoring: VTM) 301a. The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural battery cells connected in series. At least one of the plural battery cells is the secondary battery according to the second embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the battery cells 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 may also have an electromagnetic contactor (for example, a switch unit 415 shown in FIG. 14) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near a switch element.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 41, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism, though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the fourth embodiment includes the battery pack according to the third embodiment. Therefore, according to the present embodiment, it is possible to provide the vehicle equipped with the battery pack capable of achieving the excellent life time property.

EXAMPLES

Examples are explained below, but the embodiments are not limited to Examples described below.

Example 1

<Production of Positive Electrode>

90% by weight of a lithium-cobalt oxide ($LiCoO_2$) powder as a positive electrode active material, 5% by weight of acetylene black as a conductive agent, and 5% by weight of polyvinylidene fluoride (PVdF) as a binder were prepared, and these were added to N-methyl-2-pyrrolidone (NMP) as a dispersion solvent and mixed to prepare a slurry. The slurry was coated on both sides of a current collector formed from an aluminum foil having a thickness of 12 μm and was then dried and pressed to produce a positive electrode.

<Production of Negative Electrode>

90% by weight of a lithium-titanium composite oxide ($Li_4Ti_5O_{12}$) powder as a negative electrode active material, 5% by weight of acetylene black as a conductive agent, and 5% by weight of PVdF as a binder were prepared, and these were added to N-methyl-2-pyrrolidone (NMP) as a dispersion solvent and mixed to prepare a slurry. The slurry was coated on both sides of a current collector formed from an aluminum foil having a thickness of 12 μm and was then dried and pressed to produce a negative electrode.

<Formation of Separator Layer>

Alumina particles (average particle size of about 1 μm) as an inorganic material and cellulose acetate as a binder were weighted so that a mass ratio was 100:1, and these were mixed with N-methyl-2-pyrrolidone (NMP) as a dispersion solvent to prepare a slurry. The slurry was coated on the produced negative electrode by micro gravure printing and was then dried to remove the NMP to thereby form a part of a separator layer. In this way, a first coating of the slurry for forming the separator layer was completed.

The obtained laminate was cut out so that the outline of the principal surface of the active material layer was a rectangle having a size of 70 mm×80 mm. The laminate had a current collecting tab part in which an active material layer and a separator layer were not formed.

Subsequently, a second coating of the slurry for forming the separator layer was performed as follows.

The same slurry as that used for the first coating of the slurry for forming the separator layer was coated over the entire length of four sides constituting the outline of the principal surface of a part of the separator layer by spray coating and was then dried to remove the NMP. In the formed separator layer, a thickness of all the four sides of the separator layer included in the outer edge region was thicker than a thickness of the separator layer in the central region.

<Measurement of Layer Thickness of Separator Layer>

The average thickness $T_{OE}$ of the outer edge region (first region) of the separator layer and the thickness $T_C$ of the central region (second region) of the separator layer were measured by the method described in the first embodiment with reference to FIG. 3. For the measurement, a digital indicator manufactured by Mitutoyo Corporation was used and a probe diameter was 5 mm.

As a result, the thickness $T_C$ of the second region of the separator layer was 12 μm.

In addition, the average thickness of each of the four sides constituting the first region of the separator layer was larger than the thickness $T_C$ of the second region of the separator layer. The average thickness $T_{OE}$ of the four sides constituting the first region of the separator layer was 15 μm.

Therefore, the ratio $T_{OE}/T_C$ of the average thickness $T_{OE}$ of the four sides constituting the first region of the separator layer to the thickness $T_C$ of the second region of the separator layer was 1.25.

<Production of Laminate Cell>

The electrode structures as the positive electrode and the negative electrode were cut into a size of 70 mm×80 mm and were alternately laminated to produce an electrode group. The obtained electrode group was housed in a pack formed with an aluminum film, which had a thickness of 0.1 mm and was configured by an aluminum foil having a thickness of 40 μm and a polypropylene layer formed on both sides of the aluminum foil, and was vacuum-dried at 120° C. for 24 hours. After that, a nonaqueous electrolytic solution was prepared by dissolving 1.2 mol/L of $LiPF_6$ as an electrolyte salt in a mixed solvent of polycarbonate and diethyl carbonate (volume ratio of 1:2). After a nonaqueous electrolyte was injected into a laminate film pack that housed the electrode group, the pack was completely sealed by heat seal to produce a laminate cell.

Example 2

Upon a second coating of a slurry for forming a separator layer, a laminate cell was produced in the same manner as described in Example 1, except that a spray deposition method was performed on only two sides that were long sides facing each other among four sides of the separator layer included in the outer edge region.

Example 3

Upon a second coating of a slurry for forming a separator layer, a laminate cell was produced in the same manner as described in Example 1, except that a spray deposition method was performed on only two sides that were short sides facing each other among four sides of the separator layer included in the outer edge region.

Example 4

Upon a second coating of a slurry for forming a separator layer, a laminate cell was produced in the same manner as described in Example 3, except that micro gravure printing was performed instead of the spray deposition method. That is, in the production of the separator layer included in the electrode structure according to this example 4, micro gravure printing was performed twice.

Example 5

A laminate cell was produced in the same manner as described in Example 1, except that an average thickness $T_{OE}$ of four sides constituting a first region of a separator layer was 13 μm.

Example 6

A laminate cell was produced in the same manner as described in Example 1, except that an average thickness $T_{OE}$ of four sides constituting a first region of a separator layer was 25 μm.

Example 7

A laminate cell was produced in the same manner as described in Example 1, except that $Li_7La_3Zr_2O_{12}$ (LLZ) having an average particle size of about 1 μm was used as a solid electrolyte instead of the inorganic material included in the slurry for forming the separator layer.

Example 8

Upon a second coating of a slurry for forming a separator layer, a laminate cell was produced in the same manner as described in Example 1, except that a spray deposition method was performed on only one long side among four sides of the separator layer included in the outer edge region.

Example 9

A laminate cell was produced in the same manner as described in Example 1, except that a thickness $T_C$ of a second region of a separator layer was 11 μm and an average thickness $T_{OE}$ of four sides constituting a first region of the separator layer was 17 μm.

Example 10

A laminate cell was produced in the same manner as described in Example 1, except that a thickness $T_C$ of a second region of a separator layer was 10 μm and an average thickness $T_{OE}$ of four sides constituting a first region of the separator layer was 18 μm.

Example 11

A laminate cell was produced in the same manner as described in Example 1, except that a thickness $T_C$ of a second region of a separator layer was 11 μm and an average thickness $T_{OE}$ of four sides constituting a first region of the separator layer was 22 μm.

Comparative Example

A laminate cell was produced in the same manner as described in Example 1, except that a second coating of a slurry for forming a separator layer was not performed.

<Evaluation of Cycle Life Time>

The laminate cells produced in Examples 1 to 11 and Comparative Example were placed in a thermostatic bath of 60° C. and charge-and-discharge cycle characteristics were evaluated. In a cycle test, in a voltage range of 1.5 V to 3.0 V, a capacity retention ratio was calculated from an initial discharge capacity at a first cycle and a discharge capacity at 100 cycles when a charge at 1 C and a discharge at 1 C were set as a 1 cycle. Then, when the capacity retention ratio of the laminate cell according to Comparative Example was set to be 1, a ratio of the capacity retention ratio of each of the laminate cells according to Examples to the capacity retention ratio of the Comparative Example was calculated.

The above results are summarized in Table 1 below. In Table 1, the "thick part" column shows side(s) thicker than the thickness of the separator layer included in the central region among the four sides of the separator layer included in the outer edge region. The "coating method" column shows how the first coating and the second coating of the slurry for forming the separator layer were performed. "MG" indicates that micro gravure printing was performed.

Figure 15:
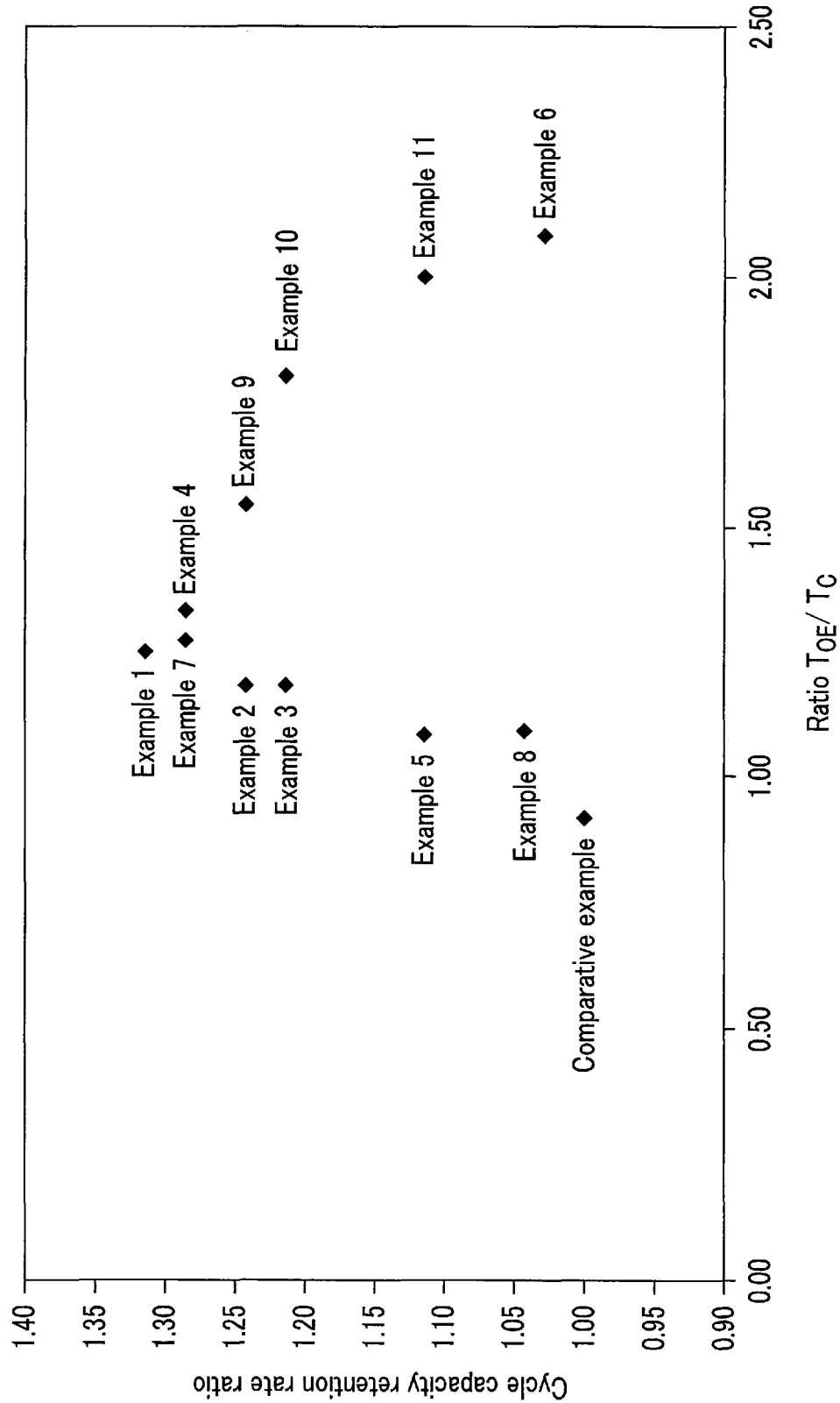
FIG. 15 is a diagram showing results of cycle life time evaluation according to Examples and Comparative Examples.

In addition, in a graph of FIG. 15, a horizontal axis is the ratio $T_{OE}/T_C$, and a vertical axis is a value of the cycle capacity retention ratio calculated as a result of evaluating the cycle life time.

TABLE 1

| | Material of Separator Layer | Thick Part | Coating Method | | Thickness of Central Region $T_C$ (μm) | Thickness of Outer Edge Region $T_{OE}$ (μm) | Ratio $T_{OE}/T_C$ | Cycle Capacity Retention Ratio |
| | | | First Coating | Second Coating | | | | |
|---|---|---|---|---|---|---|---|---|
| Example 1 | Alumina | Four sides | MG | Spray deposition | 12 | 15 | 1.25 | 1.31 |
| Example 2 | Alumina | Two long sides | MG | Spray deposition | 11 | 13 | 1.18 | 1.24 |
| Example 3 | Alumina | Two short sides | MG | Spray deposition | 11 | 13 | 1.18 | 1.21 |
| Example 4 | Alumina | Two short sides | MG | MG | 12 | 16 | 1.33 | 1.29 |

TABLE 1-continued

| | Material of Separator Layer | Thick Part | Coating Method | | Thickness of Central Region $T_C$ (μm) | Thickness of Outer Edge Region $T_{OE}$ (μm) | Ratio $T_{OE}/T_C$ | Cycle Capacity Retention Ratio |
|---|---|---|---|---|---|---|---|---|
| | | | First Coating | Second Coating | | | | |
| Example 5 | Alumina | Four sides | MG | Spray deposition | 12 | 13 | 1.08 | 1.11 |
| Example 6 | Alumina | Four sides* | MG | Spray deposition | 12 | 25 | 2.08 | 1.03 |
| Example 7 | Solid electrolyte (LLZ) | Four sides | MG | Spray deposition | 11 | 14 | 1.27 | 1.29 |
| Example 8 | Alumina | One long sides | MG | Spray deposition | 11 | 12 | 1.09 | 1.04 |
| Example 9 | Alumina | Four sides | MG | Spray deposition | 11 | 17 | 1.55 | 1.24 |
| Example 10 | Alumina | Four sides | MG | Spray deposition | 10 | 18 | 1.80 | 1.21 |
| Example 11 | Alumina | Four sides | MG | Spray deposition | 11 | 22 | 2.00 | 1.11 |
| Comparative Example | Alumina | No side | MG | — | 12 | 11 | 0.92 | 1.00 |

*Breakage occurs in a part of the outer edge

From Table 1 and FIG. 15, for example, the followings can be seen.

From the comparison between Example 1 and Examples 2 and 3, it is found that a case where all the four sides of the separator layer included in the outer edge region are thicker than the separator layer included in the central region has the excellent life time property, as compared with a case where only two long sides or two short sides are thicker than the separator layer included in the central region.

From the comparison between Example 2 and Example 3, it is found that a case where two long sides among four sides of the separator layer included in the outer edge region are thicker than the separator layer included in the central region has the excellent life time property, as compared with a case where only two short sides are thicker.

For example, from the comparison between Example 1 and Examples 5 and 6, it is found that the excellent cycle life time property can be achieved when the ratio $T_{OE}/T_C$ is within a range of 1.2 to 1.8.

As shown in Examples 1, 4, and 7, it is found that the particularly excellent cycle life time property can be achieved when the ratio $T_{OE}/T_C$ is within a range of 1.2 to 1.4.

From the comparison between Example 1 and Example 7, it is found that the excellent cycle life time property can be achieved even if the inorganic material included in the separator layer is changed to a solid electrolyte.

According to at least one embodiment described above, the electrode structure includes a current collector, an active material layer provided on at least one surface of the current collector, and a separator layer provided on the active material layer. The separator layer includes a first region, and a second region which is adjacent to the first region and exists in the inside of the first region. An outline of a principal surface of the active material layer overlaps the first region of the separator layer, and a thickness of at least a part of the first region of the separator layer is thicker than a thickness of the second region of the separator layer. Therefore, the electrode breakage can be inhibited and the excellent cycle life time property can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode structure comprising:
   a current collector;
   an active material layer provided on at least one surface of the current collector; and
   a separator layer provided on the active material layer,
   wherein the separator layer comprises a first region, and a second region which is adjacent to the first region and exists in the inside of the first region,
   an outline of a principal surface of the active material layer overlaps the first region of the separator layer,
   at least a part of the first region and the second region are on the principal surface of the active material layer,
   a thickness of the at least a part of the first region of the separator layer is thicker than a thickness of the second region of the separator layer, and
   wherein the entirety of an interfacing surface of the first region of the separator layer is in direct contact with the outline of the principal surface of the active material layer.

2. The electrode structure according to claim 1, wherein an outer peripheral shape and an inner peripheral shape of the first region are a square or a rectangle,
   the first region of the separator layer comprises a side portion surrounded by the outer peripheral shape of the first region and the inner peripheral shape of the first region,
   the at least a part of the first region corresponds to the side portion, and
   an average thickness of the side portion is larger than the thickness of the second region.

3. The electrode structure according to claim 1, wherein an outer peripheral shape and an inner peripheral shape of the first region are a square or a rectangle, the first region of the separator layer comprises a side portion surrounded by the outer peripheral shape of the first region and the inner peripheral shape of the first region, the side portion is composed of four sides, an average thickness of a first pair of two sides facing each other among the four sides is larger than an average thickness of a second pair of the other two sides facing each other, the at least a part of the first region corresponds to the first pair, and the average thickness of the first pair is larger than the thickness of the second region of the separator layer.

4. The electrode structure according to claim 3, wherein the outer peripheral shape and the inner peripheral shape of the first region are a rectangle, the inner peripheral shape of the first region is similar to the outer peripheral shape of the first region, and two sides constituting the first pair exist on long sides of the rectangle, and two sides constituting the second pair exist on short sides of the rectangle.

5. The electrode structure according to claim 2, wherein a ratio $T_C/T_{OE}$ of a thickness $T_C$ of the second region of the separator layer to an average thickness $T_{OE}$ of the side portion of the first region of the separator layer is within a range of 1.05 to 2.30.

6. The electrode structure according to claim 3, wherein a ratio $T_C/T_{OE}$ of a thickness $T_C$ of the second region of the separator layer to an average thickness $T_{OE}$ of the first pair of the first region of the separator layer is within a range of 1.05 to 2.30.

7. The electrode structure according to claim 1, wherein the separator layer comprises a solid electrolyte, and the solid electrolyte is inorganic solid particles having lithium ion conductivity.

8. A secondary battery comprising:

a positive electrode;

a negative electrode comprising the electrode structure according to claim 1; and an electrolyte.

9. A battery pack comprising the secondary battery according to claim 8.

10. The battery pack according to claim 9, further comprising an external power distribution terminal and a protective circuit.

11. The battery pack according to claim 9, comprising plural of the secondary batteries, wherein the secondary batteries are electrically connected in series, in parallel, or in combination of series connection and parallel connection.

12. A vehicle comprising the battery pack according to claim 9.

13. The vehicle according to claim 12, which comprises a mechanism configured to convert kinetic energy of the vehicle into regenerative energy.

14. The electrode structure according to claim 5, wherein the ratio $T_C/T_{OE}$ is within a range of 1.2 to 1.8.

15. The electrode structure according to claim 6, wherein the ratio $T_C/T_{OE}$ is within a range of 1.2 to 1.8.

* * * * *